United States Patent
Morioka et al.

(10) Patent No.: US 7,535,879 B2
(45) Date of Patent: *May 19, 2009

(54) WIRELESS COMMUNICATION SYSTEM, WIRELESS COMMUNICATION APPARATUS, WIRELESS COMMUNICATION METHOD, AND COMPUTER PROGRAM

(75) Inventors: Yuichi Morioka, Kanagawa (JP); Kazuyuki Sakoda, Tokyo (JP); Shinichi Kuroda, Tokyo (JP); Ryo Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 664 days.

This patent is subject to a terminal disclaimer.

(21) Appl. No.: 11/031,132

(22) Filed: Jan. 10, 2005

(65) Prior Publication Data

US 2005/0201361 A1    Sep. 15, 2005

Related U.S. Application Data

(63) Continuation-in-part of application No. 10/910,646, filed on Aug. 4, 2004.

(30) Foreign Application Priority Data

Jan. 8, 2004   (JP)   ............... 2004-003530
Jul. 2, 2004   (JP)   ............... 2004-196837
Dec. 17, 2004  (JP)   ............... 2004-366912

(51) Int. Cl.
*H04Q 7/24*    (2006.01)
*H04J 3/16*    (2006.01)

(52) U.S. Cl. ...................... 370/338; 370/465
(58) Field of Classification Search ............... None
See application file for complete search history.

(56) References Cited

U.S. PATENT DOCUMENTS

| 2004/0047296 | A1* | 3/2004 | Tzannes et al. | 370/252 |
| 2005/0135318 | A1* | 6/2005 | Walton et al. | 370/338 |
| 2005/0136933 | A1* | 6/2005 | Sandhu et al. | 455/450 |
| 2006/0098605 | A1* | 5/2006 | Li | 370/338 |

* cited by examiner

*Primary Examiner*—Wing F Chan
*Assistant Examiner*—Eunsook Choi
(74) *Attorney, Agent, or Firm*—Oblon, Spivak, McClelland, Maier & Neustadt, P.C.

(57) ABSTRACT

Random access operation is performed under a communication environment in which a plurality of communication modes having different transmission rate coexist with small overhead. A high-grade communication station spoofs information of a packet length and a rate in a decoding portion so that a value of (packet length)/(rate) corresponds to a duration where the communication is hoped to be stopped. The other station receiving the spoofed information receives the rest of the packet with the designated rate during the interval designated by the value of (packet length)/(rate). In this case, the packet length and the rate are not those of actually transmitted packet so that this packet is discarded.

70 Claims, 18 Drawing Sheets

FIG. 5

| RATE | 1 BIT | 2 BIT | 3 BIT | 4 BIT |
|---|---|---|---|---|
| 6 | 1 | 1 | 0 | 1 |
| 9 | 1 | 1 | 1 | 1 |
| 12 | 0 | 1 | 0 | 1 |
| 18 | 0 | 1 | 1 | 1 |
| 24 | 1 | 0 | 0 | 1 |
| 36 | 1 | 0 | 1 | 1 |
| 48 | 0 | 0 | 0 | 1 |
| 54 | 0 | 0 | 1 | 1 |

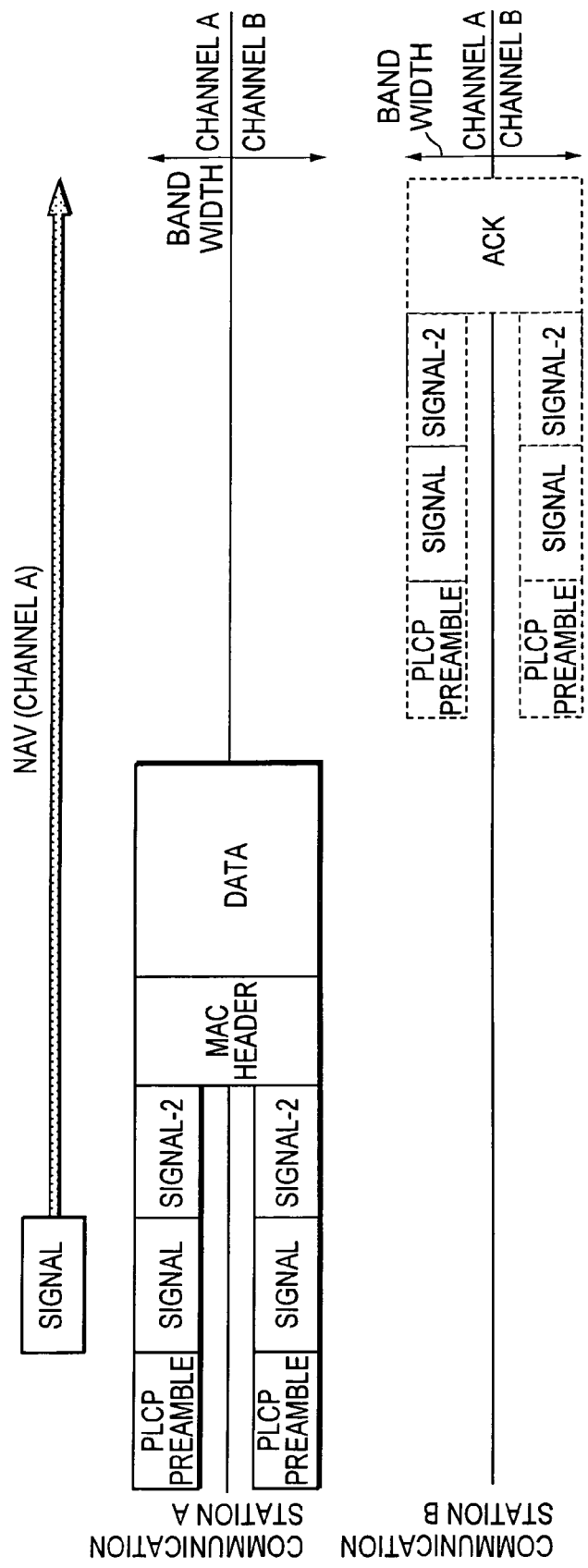

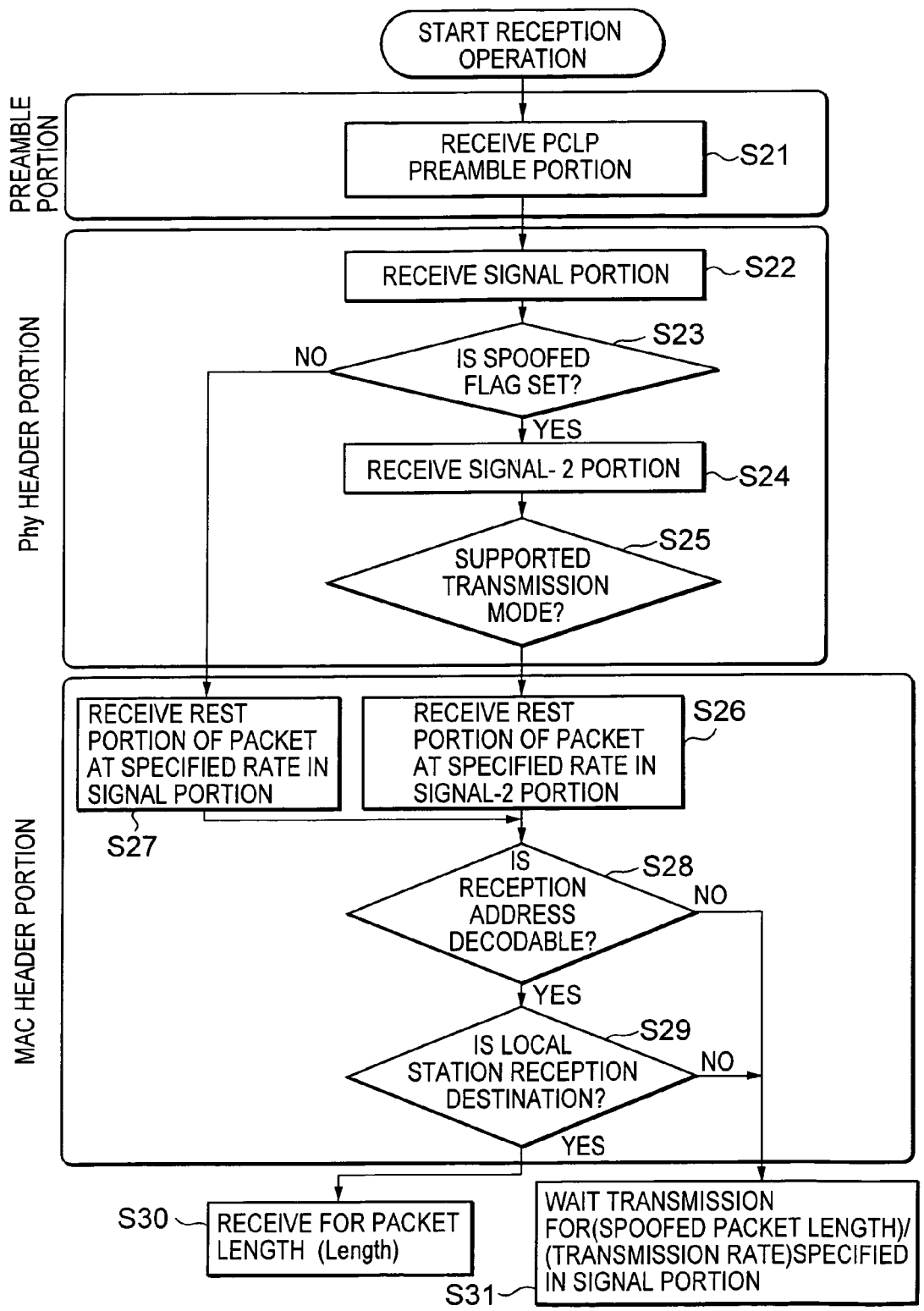

WIRELESS COMMUNICATION SYSTEM, WIRELESS COMMUNICATION APPARATUS, WIRELESS COMMUNICATION METHOD, AND COMPUTER PROGRAM

CROSS REFERENCE TO RELATED APPLICATION

This application claims priority from Japanese Priority Documents No. 2004-3530, filed on Jan. 8, 2004, No. 2004-196837, filed on Jul. 2, 2004, and No. 2004-366912, filed on Dec. 17, 2004 with the Japanese Patent Office, which documents are hereby incorporated by reference.

BACKGROUND OF THE INVENTION

1. Field of the Invention

The present invention relates to a wireless communication system, a wireless communication apparatus, a wireless communication method, and a computer program for performing mutual communication among a plurality of wireless stations like a wireless local area network (LAN). In particular, the present invention relates to a wireless communication system, a wireless communication apparatus, a wireless communication method and a computer program in which each communication station performs random access on the basis of carrier detection in accordance with the carrier sense multiple access with collision avoidance (CSMA) system.

To be more precise, the present invention relates to a wireless communication system, a wireless communication apparatus, a wireless communication method and a computer program for realizing random access in a communication environment in which a plurality of communication modes each having a transmission rate different from each other is intermixed. In particular, the present invention relates to a wireless communication system, a wireless communication apparatus, a wireless communication method and a computer program for realizing random access with a smaller overhead under a communication environment in which a plurality of communication modes each having a transmission rate different from each other is intermixed.

2. Description of the Related Art

By setting up a LAN by connecting a plurality of computers to each other, the sharing of information such as a file and data, and the sharing of peripheral equipment such as a printer can be achieved, and further the exchange of information such as the transfer of electronic mail, data, contents and the like can be preformed.

Conventionally, a wired LAN connection using an optical fiber, a coaxial cable or a twisted-pair cable has been generally used. In this case, line construction work is needed, and it is difficult to set up a network easily. Furthermore, the laying of a cable is troublesome. In addition, after setting up a LAN, because the moving range of an apparatus is limited by the length of a cable, the wired LAN is inconvenient.

Accordingly, a wireless LAN is noticed as a system for releasing a user from LAN wiring of the wired system. Because almost all of wiring cables can be omitted in a work space such as an office in case of the wireless LAN, communication terminals such as personal computers (PC's) can be relatively easily moved.

In recent years, as the wireless LAN system has become high in speed and low in cost, the demand of the wireless LAN has been remarkably increased. In particularly, in the most recent days, for performing information communication among a plurality of electronic apparatus existing around a person by setting up a small-scale wireless network among them, the introduction of a personal area network (PAN) has been examined. For example, different wireless communication systems using frequency bands such as a 2.4 GHz band and a 5 GHz band which are not required to be licensed by the competent authorities to use have been defined.

As normal standards with regard to the wireless network, Institute of Electrical and Electronics Engineers (IEEE) 802.11 (see, for example, Non-Patent Document 1), High Performance Wireless Local Area Network (HIPERLAN)/2 (see, for example, Non-Patent Document 2 or Non-Patent Document 3), IEEE 802.15.3, Bluetooth communication and the like can be cited. The IEEE 802.11 standard includes various wireless communication systems such as an IEEE 802.11a standard and an IEEE 802.11b standard according to the differences of a wireless communication system, a frequency band to be used, and the like.

A method of providing an apparatus to be a control station called as an "access point" or a "coordinator" in an area to form a network under the generalized control by the control station for constituting a local area network by means of a wireless technique is generally used.

A wireless network locating an access point therein widely adopts an access control method based on a band reservation, in which when a certain communication apparatus performs an information transmission, the communication apparatus first reserves a band necessary for the information transmission at an access point for using a transmission path in order not to generate any collisions with the information transmission of anther communication apparatus. That is, the wireless network performs a synchronized wireless communication in which each communication apparatus in the wireless network is synchronized with each other by locating the access point.

However, there is a problem in which the usability of a transmission path is reduced to half when an asynchronous communication is performed between communication apparatus on a transmission side and a reception side in a wireless communication system locating an access point therein because the wireless communication through the access point is certainly necessary.

On the other hand, as an another method for constituting a wireless network, an "ad-hoc communication" in which terminals are directly perform wireless communications with each other asynchronously has been devised. In particular, in a small-scale wireless network composed of a relatively few clients positioned near to each other, the ad-hoc communication, by which arbitrary terminals can directly perform asynchronous wireless communications with each other without using a specific access point, is considered to be suitable.

Because there is no central control station in an ad-hoc type wireless communication system, the system is suitable for constituting, for example, a home network composed of household electric apparatus. An ad-hoc network has the following features. That is, even if a terminal is in trouble or the power source thereof is off, a routing can be automatically changed, and consequently the network is difficult to break. Also, data can be transmitted relatively long distance while keeping a high-speed data rate by making a packet hop a plurality of times between mobile stations. Many development examples with regard to the ad-hoc system are known (see, for example, Non-Patent Document 4).

For example, in an IEEE 802.11 series wireless LAN system, an ad-hoc mode in which terminals operate in an autonomous distributed way in peer to peer without locating any control station is prepared.

Hereupon, it is necessary to avoid contention when a plurality of users accesses the same channel. As a typical communication procedure for avoiding the contention, carrier sense multiple access with collision avoidance (CSMA) is known. The CSMA indicates a connection method of performing multiple access on the basis of carrier detection. Because it is difficult to receive a signal which a terminal itself has performed an information transmission thereof in a wireless communication, a terminal starts own information transmission after confirming the nonexistence of information transmissions of the other communication apparatus not by a CSMA/collision detection (CD) method but by a CSMA/collision avoidance (CA) method for avoiding any collisions.

A communication method based on the CSMA/CA is described with reference to FIG. 11. In the example shown in the drawing, it is supposed that there are four communication stations #0 to #3 under a certain communication environment.

Each communication station having transmission data monitors a medium state for a predetermined inter frame space, or a distributed coordination function (DCF) inter frame space (DIFS), from the last detection of a packet. When any media are clear, namely when there are no transmission signals, the communication station performs random backoff. Furthermore, when there are no transmission signals also in this period, a transmission right is given to the communication station.

In the shown example, after monitoring the medium state for an inter frame space DIFS, the communication station #0, which has the random backoff set to be shorter than that of the other peripheral stations, acquires the transmission right to be able to start a data transmission to the communication station #1.

At the data transmission, the communication station #0, or the transmission source, stores the information for a network allocation vector (NAV), and describes a period of time until the completion of the transaction of a data communication in a duration field of the header of a MAC frame (MAC header).

The communication station #1, or the transmission destination of the data frame, performs a reception operation of the data addressed to the local station for the duration of the Duration described in the MAC header. When the data reception has been completed, the communication station #1 returns an ACK packet to the communication station #0, or the data transmission source.

Moreover, the communication stations #2 and #3, which have received the data frame, and which are not the data transmission destinations, decode the description in the Duration field of the MAC header, and recognize the state in which the medium is occupied without monitoring the medium until the transaction ends to stop the transmission. The work is called that the peripheral stations "set a NAV", or the like. The NAV is effective over the duration indicated in the Duration field. For example, the duration until the communication station #1, or the reception destination, will return the ACK packet is specified as the Duration.

In such a way, according to the CSMA/CA system, contention is avoided while a single communication station acquires a transmission right, and while peripheral stations stop their data transmission operations during the duration of the data communication operation, and thereby collisions can be avoided.

Hereupon, it is known that a concealed terminal problem is generated in a wireless LAN network in an ad-hoc environment. The concealed terminal indicates a communication station which a communication station on one side of a communication party can hear but a communication station on the other side of the communication party cannot hear in case of performing a communication between certain specific communication stations. Because no negotiations can be performed between concealed terminals, there is the possibility that transmission operations collide with each other only by the above-mentioned CSMA/CA system.

A CSMA/CA in accordance with an RTS/CTS procedure is known as a methodology for solving the concealed terminal problem. Also in the IEEE 802.11, the methodology is adopted.

In an RTS/CTS system, a data transmission source communication station transmits a transmission request packet Request To Send (RTS), and starts a data transmission in response to the reception of a confirmation note packet Clear To Send (CTS) from a data transmission destination communication station. Then, when a concealed terminal receives at least one of the RTS and the CTS, the concealed terminal sets a transmission stop duration of the local station for the duration in which the data transmission based on the RTS/CTS procedure is expected to be performed, and thereby collisions can be avoided. The concealed terminal for a transmission station receives the CTS to set a transmission stop duration for avoiding the collision with a data packet. The concealed terminal for a reception station receives the RTS to stop the transmission duration for avoiding the collision with the ACK.

FIG. 12 shows an operation example of the RTS/CTS procedure. Incidentally, it is supposed that there are four communication stations #0 to #3 in the communication environment of the wireless communication environment. The communication stations #0 to #3 are supposed to be in the following state. That is, the communication station #2 can communicate with the adjacent communication station #0. The communication station #0 can communicate with the adjacent communication stations #1 and #2. The communication station #1 can communicate with the adjacent communication stations #0 and #3. The communication station #3 can communicate with the adjacent communication station #1. However, the communication station #2 is a concealed terminal for the communication station #1, and the communication station #3 is a concealed terminal for the communication station #0.

Each communication station having transmission data monitors a medium state for a predetermined inter frame space DIFS (DCF Inter Frame Space) until the communication station has detected a packet last. When the medium is clear, namely when the there are no transmission signals, during this period of time, the communication station performs random backoff. Moreover, when there are no transmission signals also during this period of time, the communication station is given a transmission right.

In the example shown in the drawing, the communication station #0, which has set the random backoff shorter than that of the other peripheral stations after the monitoring of the medium state for the inter frame space DIFS, can acquire the transmission right to start the data transmission to the communication station #1.

That is, the communication station #0, which transmits data, transmits a transmission request packet (RTS) to the communication station #1. On the other hand, the communication station #1 being the reception destination returns a confirmation note (CTS) to the communication station #0 after a shorter inter frame space Short IFS (SIFS). Then, the communication station #0 responds to the reception of the CTS packet to start the transmission of a data packet after the inter frame space SIFS. Moreover, when the communication station #1 completes the reception of the data packet, the communication station #1 returns an ACK packet with an inter frame space SIFS put between. Because the inter frame space SIFS is shorter than the inter frame space DIFS, the communication station #1 can transmit the CTS packet before the other stations, which acquires the transmission right after waiting for DIFS+random backoff in accordance with a CMSA/CA procedure.

At this time, the communication station #2 and the communication station #3, both located at positions where both of them can be concealed terminals from both of the communication station #0 and the communication station #1, performs control to detect the use of a transmission path by the reception of the RTS or the CTS, and not to perform any transmissions until the communication ends.

To put it more specific, the communication station #2 detects the start of the data transmission of the communication station #1 as the transmission source on the basis of an RTS packet, and decodes the Duration field described in the MAC header of the RTS packet, and further recognizes that the transmission path has been already used after that for the duration until the successive transmission of the data packet is completed (the duration until the end of ACK). Thereby, the communication station #2 can set a NAV.

Moreover, the communication station #3 detects the start of the data transmission of the communication station #1 as the reception destination on the basis of the CTS packet, and decodes the Duration field described in the MAC header of the CTS packet, and further recognizes that the transmission path has been already used after that during the duration until the transmission of the successive data packet is completed (the duration until the ACK had ended). Thereby, the communication station #3 can set a NAV.

In such a way, when a concealed terminal receives at least one of the RTS and the CTS, the concealed terminal sets the transmission stop duration of the local station for the duration to be expected to perform the data transmission based on the RTS/CTS procedure. Consequently, collisions can be avoided.

Now, the standardization of the IEEE 802.11g for supporting higher speed communication rate as a higher rank standard of the IEEE 802.11b being a wireless LAN specification using 2.4 GHz band has been advanced. A communication station in accordance with the IEEE 802.11g (hereinafter also referred to "high-grade communication station" simply) can also operate in accordance with the IEEE 802.11b, and can transmit a data packet also at a high-speed rate at which a conventional communication station in accordance with the IEEE 802.11b (hereinafter also referred to as "conventional station" simply) cannot perform any reception.

Hereupon, there is a problem of the coexistence of different communication systems, or a problem of the coexistence of the IEEE 802.11g and the IEEE 802.11b, both using the same band. That is, because the conventional station cannot receive a data packet to be transmitted at a high-speed rate, the conventional station cannot decode the Duration described in the MAC header, and cannot set a NAV appropriately. Consequently, the conventional station cannot avoid collisions.

For example, in the example shown in FIG. 11, the communication station #0 and the communication station #1, both being communication parties, can exchange a data packet at a high-speed rate in conformity with IEEE 802.11g. On the other hand, when the communication station #2 and the communication station #3 around the communication station #0 and the communication station #1 are conventional stations which do not conform to the IEEE 802.11g, the communication stations #2 and #3 cannot decode the Duration described in the MAC header as a result of being unable to receive the data packet. Consequently, there is the possibility that the communication stations #2 and #3 start their communication operation even in the duration of the Duration to generate a collision (see FIG. 13).

The present inventors consider that the problem of the coexistence of the IEEE 802.11g and the IEEE 802.11b is preferably solved by the setting of the IEEE 802.11g, being a higher rank standard, to assure ad-hoc compatibility.

For example, a method of performing the exchange of an RTS/CTS packet at a transmission rate at which a conventional station can receive the RTS/CTS packet before the transmission of a data packet in IEEE 802.11g can be considered (see FIG. 14). In this case, peripheral conventional stations decodes the Duration field described in the MAC header of the RTS/CTS packet, and recognize that the transmission path has already used for the duration until the completion of the transmission of the successive data packet after that (the duration until ACK ends). Thereby, the peripheral conventional stations can set an NAV only for suitable duration. That is, the conventional stations cannot hear a data packet to be transmitted at a high-speed rate, but that turns to be no problem for avoiding a collision.

A procedure for securing a band in accordance with the above-mentioned procedure before the transmission of a data packet is generally called a virtual carrier sense.

However, in such a band securing procedure, the transmission of a data packet cannot be performed without performing the RTS/CTS procedure certainly not only in the case where the concealed terminal problem is generated, but also in the case where the concealed terminal problem does not exist. That is, the faster the transmission rate becomes, the larger the problem of an RTS/CTS overhead becomes. Also, the communication efficiency decreases by the degree of the problem.

Non-Patent Document 1: International Standard ISO/IEC 8802-11: 1999(E) ANSI/IEEE Std. 802.11, 1999 Edition, Part 11: Wireless LAN Medium Access Control (MAC) and PHYsical Layer (PHY) Specifications.

Non-Patent Document 2: ETSI Standard ETSI TS 101 761-1 V1. 3.1 Broadband Wireless Access Networks (BRAN); HIPERLAN Type 2; Data Link Control (DLC) Layer; Part1: Basic Data Transport Functions.

Non-Patent Document 3: ETSI TS 101 761-2 V1. 3.1 Broadband Wireless Access Networks (BRAN); HIPERLAN Type 2; Data Link Control (DLC) Layer; Part 2: Wireless Link Control (RLC) sublayer.

Non-Patent Document 4: C. K. Tho, "Ad Hoc Mobile Wireless Network" (Prentice Hall PTR Corp.).

SUMMARY OF THE INVENTION

It is one of objects of the present invention to provide a superior wireless communication system, a wireless communication apparatus, a wireless communication method, and a computer program in which each communication station can suitably perform random access by the CSMA system on the basis of carrier detection.

It is another one of objects of the present invention to provide a superior wireless communication system, a wireless communication apparatus, a wireless communication method, and a computer program which can realize random access in a communication environment in which a plurality of communication modes each having a different transmission rate to each other intermixes.

It is a further another one of objects of the present invention to provide a superior wireless communication system, a wireless communication apparatus, a wireless communication method, and a computer program which can realize random access with a smaller overhead in a communication environment in which a plurality of communication modes each having a different transmission rates to each other intermixes.

The present invention was made in consideration of the above-mentioned problems. A first aspect of the present invention is a wireless communication system in which a first communication station operating according to a first communication method and a second communication station capable of operating according to both of the first communication method and a second communication method coexist, wherein the second communication station transmits a packet composed of a first portion capable of being received according to the first communication method, and a second portion capable of being received according to the second communication method.

In this case, the "system" hereupon indicates a matter made of a plurality of logically aggregate apparatus (or logically aggregate functional modules realizing specific functions), and it does not matter whether each of the apparatus or the functional modules is in a single housing or not.

Moreover, the first communication method hereupon corresponds to, for example, the IEEE 802.11b being a wireless LAN specification using a 2.4 GHz band, and the second communication method corresponds to the IEEE 802.11g supporting a high-speed communication rate as a higher rank standard of the IEEE 802.11b.

Under such communication environment, there is a problem of the coexistence of the IEEE 802.11g and the IEEE 802.11b, both using the same frequency band.

For example, when a transmission and a reception of a packet is performed by random access, for example, the local station transmits a data packet as a data transmission station, and hopes that peripheral stations stop their communication operations for expected duration until an ACK is returned from a reception station. Moreover, when the RTS/CTS procedure is adopted, for example, the local station transmits an RTS or a CTS packet, and hopes that the peripheral stations stop their communication operations for the expected duration until the ACK is returned. However, when the second communication station operating in accordance with the higher rank standard performs a packet transmission according to the second communication method, a conventional station cannot receive the data packet transmitted at a high-speed rate, and cannot decode a duration described in a MAC header. Then, the conventional station cannot set a NAV suitably, and cannot avoid a collision.

In the wireless communication system according to the present invention, a packet is composed of a first portion capable of being received according to a first communication method, and a second portion capable of being received according to a second communication method. The first portion includes information related to a packet length and a transmission rate of the packet. Further, the first communication station that receives the packet calculates (packet length)/(transmission rate) on the basis of the packet length and the transmission rate of the packet, both capable of being obtained by decoding the first portion, in order to obtain a residual reception period of time of the packet.

Then, when the second communication station performs a communication procedure according to the second communication method, the second communication station describes spoofed information of a packet length and a transmission rate in the first portion like the indication of the duration for which communication operations of the other stations are stopped by (packet length)/(transmission rate) for the sake of the communication procedure. In such a case, the first communication station cannot receive the second portion of the packet, but can avoid a collision by calculating the (packet length)/(transmission rate) on the basis of the description in the first portion to set the NAV for desired duration, and by stopping any data transmissions.

That is, in the wireless communication system according to the present invention, the second communication station performing a packet transmission spoofs about the information of the packet length and the transmission rate to be described in the first portion in order that the first communication station receiving the packet may stop its communication operation for the duration until a communication transaction to be performed according to the second communication method ends. Thereby, the second communication station performing the second communication method realizes the so-called upper compatibility to the first communication station.

The duration until the communication transaction ends hereupon, specifically indicates the duration until an ACK transmission ends in a communication procedure preformed according to the second communication method. Moreover, when a packet transmission is performed in accordance with a communication procedure to perform multiple connections with a plurality of communication stations in the second portion, the duration hereupon indicates the duration until all of the ACK transmissions performed in a time division multiplex from each remote station end. Moreover, the transmission of the ACK packet hereupon is not limited to the case of single ACK packet, but includes, for example, the case where the ACK packet is multiplexed with other kinds of packets such as an RTS packet, a CTS packet, and data packet to be transmitted.

For the second communication station described above realizes the mechanism of the ad-hoc compatibility, it is necessary for each second communication station to recognize that the information of the packet length and the transmission rate described in the first portion is spoofed. Moreover, it is necessary that each second communication station mutually recognizes the spoofing of the information while the first communication station cannot know the spoofing of the information to operate in accordance with the description in the first portion.

Accordingly, in the wireless communication system according to the present invention, the second communication station performing a packet transmission describes whether the spoofed information of a packet length and a transmission rate is described in the first portion or not in a packet in a format which the second communication station capable of operating according to the second communication method can decode the spoofed information but the first communication station operating according to the first communication method cannot decode the spoofed information.

For example, the second communication station performing a packet transmission indicates whether the spoofed information of the packet length and the transmission rate is described or not by means of a spoofed flag in the first portion.

In this case, when the second communication station being a data reception side detects that the information of the packet length and the transmission rate in the first portion of a packet received from another station is spoofed, the second communication station switches its reception method to the second communication method, and can perform the reception operation of the residual portion of the packet.

Moreover, the second communication station performing a packet transmission may be provided with a known second communication method portion, in which all of the second communication stations can decode data, in a packet, and may describe whether spoofed information of a packet length and a transmission rate is described or not in the second communication method portion for notifying the other second communication stations of the spoofing. For example, when a plurality of communication modes each having a transmission rate different from each other is defined as the second communication method, an actually used communication mode may be described in the second communication method portion.

It is preferable that a second communication station performing a packet transmission transmits the second communication method portion in a communication method in which all of the second communication stations can decode the data in the second communication method portion but the first communication stations cannot decode the data. For example, the second communication station performing the packet transmission transmits the second communication method portion at a low transmission rate of about 6 Mbps in order that all of the second communication stations can receive, but the second communication station performing the packet transmission performs the modulation processing of the second communication method portion in accordance with a modulation system which each of the second communication stations knows but the first communication stations do not know. Thereby, only the second communication stations can demodulate the second communication method portion to recognize that the first portion is spoofed.

In such a case, a second communication station receiving the packet tries to decode the second communication method portion by means of both of the first communication method and the communication method by which the first communication station cannot decode the second communication method portion, and the second communication station can recognize that the first portion is spoofed by the fact that the second communication method portion can be decoded according to the latter method. Then, the second communication station can performs the reception processing of the second portion in accordance with the communication mode obtained from the second communication method portion.

For example, the second communication station locates the second communication method portion before the second portion in a packet. Then, when the second communication station describes the spoofed information of a packet length and a transmission rate for the first communication stations in the first portion, the second communication station describes the information related to an actual packet length and a transmission rate in the second portion in the second communication method portion. In such a case, a second communication station receiving the packet can perform the reception operation of the second portion after the second communication method portion of the received packet on the basis of the information related to the packet length and the transmission rate described in the second communication method portion.

A second communication station performing a packet transmission can make data to be able to be decoded by all of the second communication stations and to be unable to be decoded by the first communication stations by modulating the second communication method portion in accordance with a modulation system which only each of the second communication station knows. For example, when the second communication station performs a phase modulation such as BPSK to the second communication method portion, the second communication station may give a phase difference $\theta$, which is jointly owned by the second communication station, to the location of a signal point $(-1, 1)$, or may translation the signal point by the known quantity $\Delta d$. On the other hand, a second communication station receiving the packet performs phase demodulation in consideration of the phase shifts of the location of the signal point such as the phase difference $-\theta$, the movement quantity $-\Delta d$ and the like. Then, it can be known that the first portion is spoofed by the fact that the second communication method portion can be decoded.

Incidentally, in the case where a second communication station capable of operating according to the second communication method is located at a position far from a transmission source, a situation in which the second communication station can receive a second communication method portion, which is transmitted at a low transmission rate, but cannot receive the second portion, which is transmitted at a high-speed transmission rate, owing to an S/N, can be also supposed. In such a case, a second communication station receiving a packet tries to perform the reception operation of a second portion on the basis of the information related to a packet length and a transmission rate described in the second communication method portion of the received packet. When the second communication station cannot decode the second portion, the second communication station may obtain a difference between a period of time (i.e. (packet length)/(transmission rate)) obtained from the spoofed packet length and the transmission rate described in the first portion and a period of time (i.e. (packet length)/(transmission rate)) obtained from the packet and the transmission rate described in the second communication method portion, and may restrain the transmission of a packet for a predetermined period of time.

The wireless communication system according to the present invention supposes, for example, a communication environment in which a conventional station operating in accordance with the IEEE 802.11b and a high-grade communication station operating in conformity with the IEEE 802.11g corresponding to a high-speed edition standard using the same band intermixedly operate.

In the wireless communication system according to the present invention, a packet to be transmitted is composed of a known fixed rate portion (hereinafter also referred to as "general decoding portion") which all of the communication stations can decode, and an arbitrary rate portion (hereinafter also referred to as "high-grade decoding portion") which possibly only a part of the communication station being at a high-grade can decode.

The general decoding portion of a packet generally describes a residual length of the packet and a rate at which residual packets are transmitted therein. Consequently, a communication station receiving the packet tries to receive the residual part of the packet by performing the reception operation of the packet at a specified rate for the duration of (packet length)/(rate).

In the present invention, a high-grade communication station performs a packet transmission at a transmission rate at which a conventional station cannot receive the packet. Also, when a conventional station is not desired to start a transmission for fixed duration, the information of a packet length and a rate in the general decoding portion is spoofed in order that the value of (packet length)/(rate) may be the duration for which the communication is desired to be stopped. For example, the value of (packet length)/(rate) should originally correspond to the reception duration of the residual portion of the packet. However, for example, the information is spoofed in order to be the duration for which a NAV such as the end of ACK should be set.

Moreover, in this case, the high-grade communication station to be a communication party is needed to detect that these values described in the general decoding portion are spoofed for performing a correct reception operation without performing any malfunctions on the basis of the spoofed rate and the length. For this sake, a flag indicating the existence of spoofing is provided in the general decoding portion of a packet. Alternatively, a second communication method portion, which all second communication stations can decode, is provided, and the fact that the general decoding portion is spoofed is described in the second communication method portion. Then, after the general decoding portion has been transmitted, the high-grade communication station shifts to an arbitrary high grade rate mode, and transmits an actual data composed of a high-grade decoding portion.

When the conventional station receives a general decoding portion including the spoofed information of a packet length and a rate, the conventional station believes the packet length and the rate to receive the residual packet at a specified rate for a period of (packet length)/(rate). Because the rate and the packet length are different from ones at which the packet is actually transmitted, the conventional station cannot decode the packet correctly, and the packet is destroyed.

On the other hand, a high-grade communication station detects that the information of a packet length and a rate is spoofed by means of the flag in the general decoding portion. Alternatively, the high-grade communication station detects the spoofing owing to the capability of decoding the second communication method portion. Then, when the general decoding portion is spoofed, the high-grade communication station shifts to the corresponding high grade rate mode, and receives the residual packet, i.e. a high-grade decoding portion. Thus, the high-grade communication station can decode actual data.

As described above, in the case where a packet length and a rate are used for setting a period of time during which all transmission starts are stopped, there are plurality of combinations of spoofed packet lengths and spoofed rates for showing the same period of time to the conventional station. On the other hand, there is a plurality of transmission modes as a high-speed communication rate sometimes. Accordingly, when a plurality of modes each including high-speed communication rate, a mode by which the residual packet is transmitted may be presumed by the setting of a rate.

Moreover, a second aspect of the present invention is a wireless communication system which is able to operate according to a plurality of communication methods, wherein at least some of communication stations transmit a package composed of the first portion which all communication stations can decode and the second portion which all communication stations can not decode.

The coexistence problem in the communication environment is not limited in the problem caused by the difference of specification between the conventional station operating in accordance with the IEEE 802.11b and a high-grade communication station operating in conformity with the IEEE 802.11g. Even between the same high-grade communication stations, there exist common problems caused by whether or not the communication modes specified in the specification are supported. For example, though transmission rate in a wide range is specified in IEEE 802.11g, it is not compulsory to support all the transmission rate. The maximum transmission rate supported by high-grade communication stations are different.

Further in the upper specification of a wireless LAN, it is possible to define a communication system which arbitrarily performs a wideband transmission by bundling 2 or more of frequency channels, if necessary, (that is, by changing bandwidth of signal) under a communication environment where a plurality of frequency channels are provided as communication available channels. However, due to the differences of bandwidth allocated to respective wireless system in different countries, it is probable to exist even a high-grade communication station which is not able to support such wideband transmission performed by bundling a plurality of frequency channels for the sake of band limitation.

In the coexistence problem of the conventional station and the high-grade communication station, it is possible to solve the problem by utilizing the fact that the former is able to decode only the first portion, but the latter is able to decode the second communication method portion and the second portion in addition to the first portion as described above. On the contrary, in the coexistence problem based on the differences of communication modes in the high-grade communication station, all of high-grade communication stations are able to decode the second communication method portion, but not all high-grade communication stations are able to decode the second portion.

In the wireless communication system according to the second aspect of the present invention, in case of preparing a plurality of communication modes for transmitting the second portion, a communication station transmitting a packet having a second portion provides a second communication method portion decodable by all communication stations that are able to decode the second portion within the transmitting packet, and designates its communication mode in the second communication method portion. The second communication method portion is transmitted with a format which is not decodable by a communication station (conventional station, for example) that is not able to decode the second portion.

In this case, the second communication method portion is arranged ahead of the second portion. When information relating to spoofed packet length and transmission rate is described within the first portion, information relating to actual packet length and transmission rate in the second portion is described in the second communication method portion. The communication station which can decode the second communication method portion is able to perform a receiving operation of the second portion based on the information relating to the actual packet length and transmission rate described in the second communication method portion in the received packet.

All high-grade communication stations are able to decode the second communication method portion. However, in the case where if it is not an obligation to apply every communication mode defined in the within the same standard specification, there is a case where, due to the differences in supported communication modes, even the high-grade communication station is not able to decode the second communication method portion based on the information relating to the actual packet length and transmission rate described within the second communication method portion of the received packet. In this case, the communication station that is not able to decode the second portion of the received packet is able to avoid a collision of packet by calculating a duration where a communication has to be stopped for the sequence of the received packet based on the information relating to the spoofed packet length and transmission rate described within the first portion of the received packet and the information relating to the actual packet length and transmission rate described within the second communication method portion, and by restraining the transmission of packet only during this duration. Specifically, it is possible to calculate the transmission waiting duration by calculating difference between the time obtained from the spoofed packet length and transmission rate described within the first portion and the time obtained from the packet length and transmission rate described within the second communication method portion.

Further, in case of utilizing a communication system that properly performs a wideband transmission by bundling 2 or more of frequency channels (that is, by changing a bandwidth of signal), it is probable that a high-grade communication station that is not able to support such wideband transmission by bundling frequency channels exists.

In case of transmitting 2 or more of the communication channels while combining them in the second portion, the high-grade communication station of the packet transmission side sequentially transmits the first portion and the second communication method portion of the transmitting packet on the respective communication channels in-use. Thereby, a peripheral station is able to receive the first portion and the second communication method portion of the packet on the communication channel where the peripheral station itself is now in operation.

When the packet transmitted by combining 2 or more of the communication channels even is not to be received even in the high-grade communication station, it is able to calculate the duration to stop the communication operation for communication sequences accompanying with the received packet based on the information relating to the spoofed packet length and the transmission rate described in the first portion received on at least one communication channel, or based on both the information relating to the spoofed packet length and the transmission rate described in the first portion received on at least one communication channel and the information relating to the actual packet length and the transmission rate described in the second communication method portion. Thereby, it is able to avoid collision of packets by refraining the transmission of packet during the corresponding duration.

Moreover, a third aspect of the present invention is a computer program described in a form capable of being read by a computer to execute on a computer system processing for a wireless communication operation in a wireless communication environment in which a first communication method and a second communication method coexist, the program including the steps of: generating a transmission packet composed of a first portion and a second portion, transmitting the first portion of the transmission packet according to the first communication method, and transmitting the second portion of the transmission packet according to the second communication method, receiving and analyzing the first portion of a received packet from another station, and receiving and analyzing the second portion of the received packet according to the second communication method.

Moreover, a forth aspect of the present invention is a computer program described in a form capable of being read by a computer to execute on a computer system processing for a wireless communication operation in a wireless communication environment in which a plurality of communication methods are allowed to operate, the program including: a packet generating step of generating a transmission packet composed of a first portion and a second portion, a transmitting step of transmitting the first portion according to a format which is decodable by all communication stations, and the second portion according to a format which is decodable not by all communication stations, a first receiving and analyzing step of receiving and analyzing the first portion of a received packet from another station, and a second receiving and analyzing step of receiving and analyzing the second portion of the received packet.

The computer program according to the third and forth aspects of the present invention defines a computer program described in the form capable of being read by a computer for realizing predetermined processing on a computer system. In other words, by installing the computer program according to the third and forth aspects of the present invention into a computer system, a cooperative operation is exhibited on the computer system, and the computer system operates as a wireless communication apparatus. By building a wireless network by activating a plurality of such wireless communication apparatus, operations and advantages similar to those of the wireless communication system according to the first and second aspects of the present invention can be obtained.

According to the present invention, it is possible to provide a superior wireless communication system, a wireless communication apparatus, a wireless communication method and a computer program in which each communication station can suitably perform random access on the basis of a carrier detection according to a CSMA system.

Moreover, according to the present invention, it is possible to provide a superior wireless communication system, a wireless communication apparatus, a wireless communication method and a computer program in which random access can be realized in a communication environment in which a plurality of communication modes each having a transmission rate different from each other intermixes.

Moreover, according to the present invention, it is possible to provide a superior wireless communication system, a wireless communication apparatus, a wireless communication method and a computer program in which random access can be realized with a smaller overhead in a communication environment in which a plurality of communication mode, each having a transmission rate different from each other, intermixes.

According to the present invention, the coexistence of the IEEE 802.11g and the IEEE 802.11a/b, both using the same band, can be realized without passing an RTS/CTS procedure. Consequently, an overhead can be remarkably reduced.

Moreover, according to the present invention, the duration for an NAV can be flexibly set. Consequently, the throughput of a system can be improved.

Further objects, features and advantages of the present invention will be apparent by more detailed descriptions based on the embodiments of the present invention and the attached drawings, which will be described later.

BRIEF DESCRIPTION OF THE DRAWINGS

FIG. 5 is a view showing a description example of Rate field in the IEEE 802.11a;

FIG. 19 is a view showing a condition where a communication station receiving channel A receives a SIGNAL portion and a SIGNAL-2 portion transmitted on channel A, and refrains transmitting operation for the predetermined time; and FIG. 20 is a flowchart designating a reception processing sequences in case when the wireless communication apparatus operates as a high-grade communication station.

DESCRIPTION OF THE PREFERRED EMBODIMENTS

Figure 1:
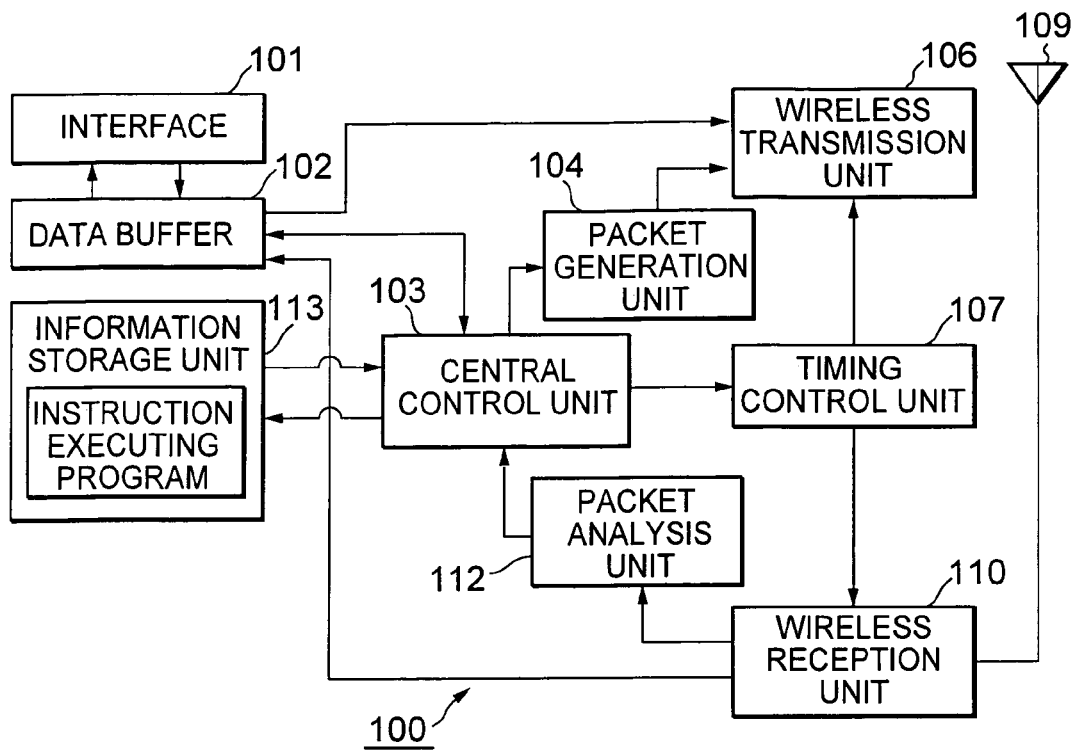
FIG. 1 is a view schematically showing a functional configuration of a wireless communication apparatus operating as a communication station in a wireless network according to one embodiment of the present invention.

The embodiments of the present invention are described in detail hereinafter with reference to the attached drawings.

Channels of communication supposed in the present invention are wireless channels, and a network is built among a plurality of communication stations. Communication supposed in the present invention is a store and forward type traffic, and information is transferred per packet. Moreover, although each communication station is supposed to have a single channel in the following description, it is also possible to expand the description to the case where a transmission medium composed of a plurality of frequency channels, i.e. multi channels, is used.

In a wireless network according to the present invention, each communication station directly (randomly) transmits information in accordance with an access procedure based on a carrier sense multiple access (CSMA) (carrier detection multiple connection), and can build an autonomous distributed type wireless network. Moreover, in the wireless network according to the present invention, transmission control using channel resources effectively is performed by means of transmission (MAC) frame in a gentle time division multiplexing access structure. In this case, each communication station can perform an access system based on a time synchronization such as reserving a frequency band and setting a priority use duration.

One embodiment of the present invention supposes, for example, a communication environment in which both high-grade communication stations in conformity with the IEEE 802.11g corresponding to a high-speed edition standard using the same band and a conventional station in conformity with the conventional IEEE 802.11b intermixedly operate. That is, there are two kinds of communication terminals, that is; conventional stations which can transmit and receive only the packets modulated according to some limited modulation systems; and high-grade communication stations which can receive packets according to a high-grade system in addition to the modulation system by which the conventional station can receive packets.

The communication system in which the IEEE 802.11g and the IEEE 802.11b, both using the same band, intermix has a problem of coexistence. The reason is that, because the conventional station cannot receive a data packet transmitted at a high-speed rate, the conventional station cannot decode the Duration described in a MAC header to set an NAV suitably, and consequently cannot avoid a collision. The present invention solves the coexistence problem by securing that the higher rank standard IEEE 802.11g assures the conventional standard IEEE 802.11b of the so-called upper compatibility. The solving method will be described later.

There is a coexistence problem even in a communication system where only high-grade communication stations in conformity with the IEEE 802.11g operate. For example, in the IEEE 802.11g, its transmission rate is defined in a wide range, but all of the transmission rates are not duty, and the maximum transmission rates supported between communication stations are different. Further in case of defining communication system where wide band transmission by bundling 2 or more of the frequency channels (that is, by changing the bandwidth of signal) as requested is properly performed under a communication environment where a plurality of frequency channels are prepared as communication available channels, there may be able to exist a high-grade communication station that is not able to support the wideband transmission by bundling a plurality of frequency channels due to the difference in band restriction allocated to a wireless system in each country. According to the present invention, the high-grade communication station, even in a case where whole packet is not decoded due to the difference in the communication modes, is able to avoid collision of packets by providing a proper transmission waiting duration.

FIG. 1 schematically shows a functional configuration of a wireless communication apparatus operating as a communication station in a wireless network according to one embodiment of the present invention. A wireless communication apparatus 100 shown here can form a network while avoiding a collision in the same wireless system by performing a channel access effectively. The wireless communication apparatus 100 is either of a conventional station, in conformity with the IEEE 802.11a/b as a first communication method and a high-grade communication station in conformity with the IEEE 802.11g as a second communication method.

As shown in FIG. 1, the wireless communication apparatus 100 is composed of an interface 101, a data buffer 102, a central control unit 103, a packet generation unit 104, a wireless transmission unit 106, a timing control unit 107, an antenna 109, a wireless reception unit 110, a packet analysis unit 112, and an information storage unit 113.

The interface 101 performs exchanges of various kinds of information between the wireless communication apparatus 100 and an external apparatus (such as a personal computer, though not shown) connected to the wireless communication apparatus 100.

The data buffer 102 is used for temporarily storing the data transmitted from the external apparatus connected to the wireless communication apparatus 100 through the interface 101, and the data received through a wireless transmission path before transmitting the data through the interface 101.

The central control unit 103 unitarily performs the administration of series of information transmission and reception processing in the wireless communication apparatus 100 and the access control of transmission paths. Basically, the central control unit 103 sets a timer of backoff to operate over a random period of time on the basis of CSMA while monitoring the states of the transmission paths, and performs access contention of acquiring a transmission right in the case where no transmission signals exist during this period of time.

Figure 2:
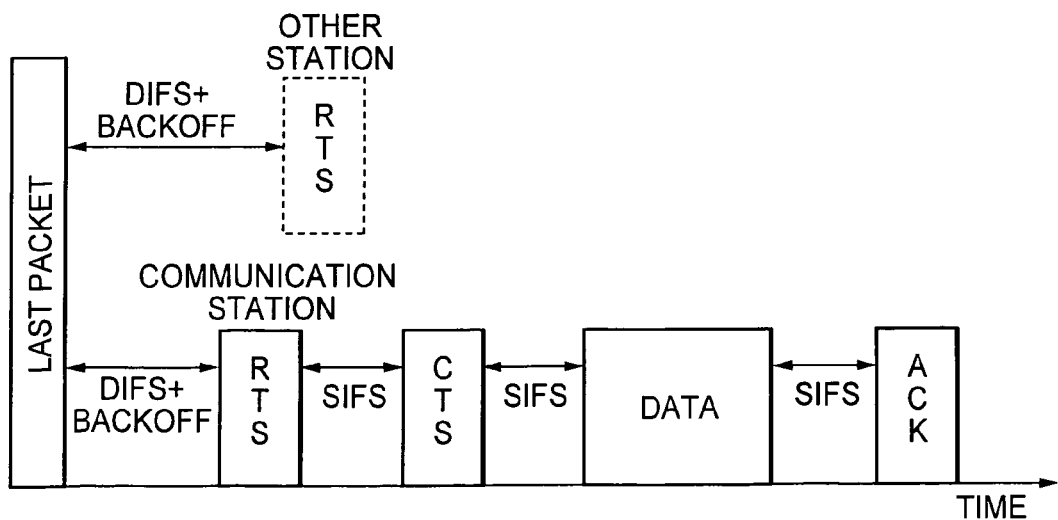
FIG. 2 is a view for illustrating a mechanism of a priority transmission based on difference of inter frame spaces.

The present embodiment adopts a mechanism of a priority transmission in the access contention to realize flexible QoS (see FIG. 2). For example, the wireless communication apparatus 100 takes a normal operation mode after a packet transmission of another station or at the time of low traffic priority, and sets an inter frame space IFS to a longer DIFS, and further sets the random backoff. On the other hand, in case of performing the transmission of CTS successively to RTS from another station, in case of performing the transmission of a data packet successively to CTS, and in case of the transmission of ACK, the wireless communication apparatus 100 sets the inter frame space IFS to a shorter SIFS, which enables a transmission prior to the other stations performing normal transmission operations.

The packet generation unit 104 generates a packet signal to be transmitted from the local station to a peripheral station. The packet hereupon includes a transmission request packet RTS from a communication station being a reception destination, a confirmation response packet CTS to the transmission request packet RTS, an ACK packet and the like as well as a data packet. For example, a data packet is generated by taking out of the transmission data stored in the data buffer 102 for a predetermined length to be set as a payload.

In a MAC layer of a communication protocol, a MAC frame is configured by adding a MAC header to a payload, and furthermore a PHY header is added at a PHY layer to be a final transmission packet structure. In the present embodiment, the PHY header constitutes a first portion, and the MAC frame portion constitutes a second portion. The configuration of a packet signal will be described later.

The wireless transmission unit 106 and the wireless reception unit 110 correspond to an RF layer and the PHY layer in the communication protocol.

The wireless transmission unit 106 performs the wireless transmission processing of a packet signal according to a predetermined modulation system and a transmission rate. To put it more specific, the wireless transmission unit 106 includes a modulator for modulating a transmission signal according to the predetermined modulation system, a D/A converter for converting a digital transmission signal into an analog signal, an up-converter for performing the frequency conversion of an analog transmission signal to up-convert the analog transmission signal, a power amplifier (PA) for amplifying the electric power of the up-converted transmission signal (all of them are not shown). The wireless transmission unit 106 performs the wireless transmission processing at a predetermined transmission rate.

Moreover, the wireless reception unit 110 performs the wireless reception processing of the packet signal from another station. To put it more specific, the wireless reception unit 110 is composed of a low noise amplifier (LNA) for amplifying the voltage of a wireless signal receiving from another station through the antenna 109, a down-converter for down-converting the voltage-amplified reception signal by frequency conversion, an automatic gain controller (AGC), an A/D converter for performing the digital conversion of an analog reception signal, a demodulator for performing a synchronous processing for acquiring a synchronization, a channel estimation, a demodulation processing by means of a demodulation system such as OFDM, and the like (all of them are not shown).

In the case where the wireless communication apparatus 100 conforms to the IEEE 802.11a/b as the first communication method, the wireless transmission unit 106 and the wireless reception unit 110 respectively perform a transmission and a reception of a packet according to a modulation system and a transmission rate in conformity with a wireless LAN standard. Moreover, in the case where the wireless communication apparatus 100 conforms to the IEEE 802.11g as the second communication method, it is possible for the wireless communication apparatus 100 to perform a transmission and reception of a packet according to a modulation system and a transmission rate in conformity with the IEEE 802.11a/b. In addition, the wireless communication apparatus 100 can perform a transmission and a reception of a packet at a transmission rate inherent to the IEEE 802.11g (i.e. a transmission and a reception unable to be received by the IEEE 802.11a/b). In the latter case, the first portion of a packet composed of the PHY header is transmitted and received at a transmission rate capable of being received by the IEEE 802.11a/b, but the second portion composed of the MAC frame is transmitted and received at a transmission rate in conformity with the IEEE 802.11g.

The antenna 109 performs the wireless transmission of a signal to another wireless communication apparatus on a predetermined frequency channel, or collects a signal transmitted from another wireless communication apparatus. The present embodiment is provided with a single antenna, and it is supposed that a transmission and a reception cannot simultaneously performed in parallel.

The timing control unit 107 controls a timing for transmitting and receiving a wireless signal. For example, the timing control unit 107 controls its own packet transmission timing, the transmission timing of each packet (such as RTS, CTS, data, and ACK) in conformity with the RTS/CTS system (setting of an inter frame space IFS and the backoff), the setting of the NAV at the time of reception of a packet addressed to another station, and the like.

The packet analysis unit 112 analyzes the packet signal which can be received from another station. In the present embodiment, the packet is composed of a first portion and a second portion. The details of a packet decoding method will be described later.

The information storage unit 113 stores an execution procedure instruction of a series of access control operations to be executed by the central control unit 103, and information obtained from an analysis result of a received packet.

As described above, in a wireless network of the present embodiment, there are two kinds of communication stations of conventional stations capable of the transmission and the reception of a packet modulated according to some limited modulation systems, and high-grade communication stations capable of the reception in conformity with a high-grade system in addition to the modulation systems in which the conventional stations can perform receptions. There is a coexistence problem in a communication system in which the IEEE 802.11g and the IEEE 802.11b using the same band intermix. Further even in a communication system where only high-grade communication stations exist, there is a coexistence problem due to the difference in the communication modes supported by respective communication stations. The present embodiment solves this problem by making the high-grade communication stations provide the so-called ad-hoc compatibility to the conventional stations. Further according to the present embodiment of the invention, even whole packets are not decoded due to the difference in the communication modes, the collision of the packets are avoided by providing a proper communication waiting duration. The details of the solution will be described later.

Figure 3:
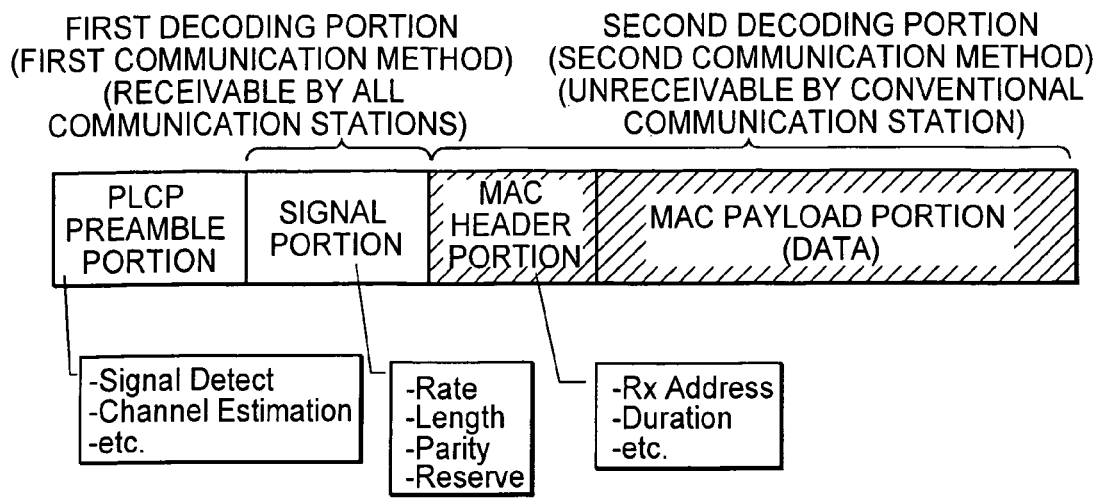
FIG. 3 is a view schematically showing one example of a frame configuration of a packet in the wireless network according to the present invention.

FIG. 3 schematically shows the configuration of a packet which the wireless communication apparatus 100 operating as a communication station in the wireless network of the present embodiment transmits and receives.

In a MAC layer of the communication protocol, a MAC frame is constituted by adding a MAC header to a payload (corresponding to an IP packet). Moreover, in a PHY layer, a PHY header is added to the MAC frame to be a final transmission packet structure. The PHY header constitutes a first portion, and the MAC frame portion constitutes a second portion. As shown in FIG. 3, a packet is composed of a physical layer convergence protocol (PLCP) preamble portion and a SIGNAL portion as the PHY header, and the MAC frame. The MAC frame is composed of the MAC header and a data portion.

The PHY header corresponds to the first portion, and the MAC frame corresponds to the second portion.

In the case where the transmission station of a packet is a conventional station in conformity with the IEEE 802.11a/b, both of the PHY header and the MAC frame are transmitted according to the first communication method.

Moreover, in the case where the transmission station of a packet is a high-grade communication station in conformity with the IEEE 802.11g, the communication station transmits the whole packet according to the first communication method when the communication station transmits the packet to a conventional station. On the other hand, when the high-grade communication station transmits a packet to a high-grade communication station, the transmitting communication station transmits only the first portion of the packet according to the first communication method, by which all communication stations can receive the first portion, and can transmit the second portion of the packet including the data portion according to the second communication method having a higher transmission rate.

On the transmission side of the shown packet, first, the PLCP preamble portion is transmitted as the head of the packet, and next, the SIGNAL portion and the MAC frame are transmitted.

The PLCP preamble portion includes elements such as a signal detect (Signal Detect) and a channel estimation (Channel Estimation). Consequently, a peripheral station knows the existence of a signal from a communication station by receiving the PLCP preamble portion, and performs the estimation of a transmission channel and the like.

The communication station knowing the transmission of the signal by the detection of the PLCP preamble portion starts the reception of the subsequently arriving SIGNAL portion. Because the SIGNAL portion is transmitted according to the first communication method, which all communication station know, both of the conventional stations and the high-grade communication stations can receive the SIGNAL portion.

The SIGNAL portion includes a transmission rate (Rate) of the subsequent MAC frame, the length (Length) of a residual data of the packet such as the MAC frame, parity (Parity), a reserved area (Reserve) and the like.

The MAC frame is modulated according to the transmission rate specified by the transmission rate (Rate) of the SIGNAL portion. The MAC frame is composed of the MAC header and the data portion corresponding to the payload. The MAC header describes an address (RX Address) of the reception station of the packet, Duration specifying the duration in which the stations other than the reception station severally should set the NAV.

A communication station which can normally receive and decode the MAC header portion compares the address of the local station with the reception address. When they coincide with each other, the communication station receives the residual portion of the packet at a specified rate for the duration of (packet length)/(transmission rate) in accordance with the transmission rate (Rate) and the packet length (Length) information, both described in the SIGNAL portion. Moreover, when its own address and the received address do not coincide with each other, the communication station sets the NAV for the Duration described in the MAC header, and restrains any transmissions from the local station. The procedure for securing a band in accordance with the procedure mentioned above is generally called as virtual carrier sense.

Now, when a transmission station of a packet being a high-grade communication station according to the IEEE 802.11b performs the transmission of the packet to a high-grade communication station, the transmission station transmits only the first portion according to the first communication method, which all communication stations can receive, but transmits the second portion including the data portion according to the second communication method having the higher transmission rate. Consequently, because the conventional stations cannot receive the second portion, the conventional stations cannot decode the Duration described in the MAC header. Consequently, there is a problem in which the conventional stations cannot know the duration for which the conventional stations should severally set the NAV.

Conventionally, the description of the Duration in the MAC header has been used for band securing. However, for realizing the coexistence of the IEEE 802.11g and the IEEE 802.11a/b, a mechanism is needed for the conventional stations to recognize the duration for which the conventional stations should severally set the NAV on the basis of other information without using the description of the Duration.

Accordingly, the present embodiment prepares a mechanism in which, even if a packet is transmitted according to the IEEE 802.11g as the second communication method, the first portion, which all communication stations can certainly receive, is provided, and the duration corresponding to the NAV is specified by means of the first portion.

As shown in FIG. 3, the first portion is composed of the PHY header of a packet. Then, the period of time corresponding to the Duration is described in a pseudo-way in the SIGNAL portion, which all communication stations can receive, by using the information of the transmission rate (Rate) and the packet length (Length). That is, the information of the transmission rate (Rate) and the packet length (Length) is spoofed so that the value of (packet length)/(rate) may be equal to the duration for which any communications are desired to be stopped.

As a result, the conventional stations severally set the packet length and the transmission rate, which are different from the fact, and perform the reception for a period of time corresponding to the Duration. The actual packet is not transmitted over the period of (packet length)/(rate), but the conventional stations do not start their transmissions for the duration corresponding to Duration. As a result, the conventional stations restrain their transmissions and continue their receiving for the duration for which communications are desired to be stopped.

Incidentally, in this case, after the conventional stations have performed the receptions for the spoofed period of (packet length)/(rate), CRC errors are certainly generated. The IEEE 802.11 has a rule in which, when a CRC error is generated in the data portion, any receptions are restrained for a period of time EIFS longer than a normal inter frame space DIFS. Accordingly, it is desirable to perform the spoofing so that a period of time obtained by subtracting "EIFS−DIFS" from the duration for which the receptions are truly desired to be continued as the period of (packet length)/(rate) for avoiding the conventional station being always unfairly treated.

As described above, the high-grade communication stations use the information of the transmission rate (Rate) and the packet length (Length) so as to describe the period of time corresponding to Duration in the first portion in a pseudo-way, and thereby the high-grade communication stations supply the so-called ad-hoc compatibility to the conventional stations. In this case, for a communication procedure according to the high-grade communication method in conformity with the IEEE 802.11g is being performed, the conventional stations avoid any collisions, and thereby a normal network operation can be realized.

Moreover, in the case where the high-grade communication stations use a high-speed transmission rate which the first communication method cannot deal with, a value which the first communication method can deal with should be set in the transmission rate (Rate) field of the SIGNAL portion as the spoofing in order that the conventional stations can correctly decode the first portion. In this case, the packet length (Length) should be also spoofed in accordance with the spoofed transmission rate (Rate) value.

As described above, the spoofing is performed in the SIGNAL portion in order that the value of (packet length)/(rate) may be equal to the duration for which the conventional stations are desired to stop communications. Hereupon the duration for which the conventional stations are desired to stop communications, in short, indicates the duration until a communication transaction performed according to the second communication method ends. To put it more specific, the duration indicates the duration until an ACK transmission in a communication procedure performed according to the second communication method ends. Moreover, when packet transmissions are performed in a communication procedure for performing multiple connections with a plurality of communication stations in a MAC frame according to the second communication method, the above-mentioned duration corresponds to the duration until all of the ACK transmissions performed from each of the remote stations in time division multiplex end. Incidentally, Japanese Patent Application No. 2003-297919 which has been assigned to the present applicant, discloses a communication system in which a transmission station transmits a data frame addressed to a plurality of reception stations by means of space division multiple access (SDMA) and each reception station replies ACK in time division multiplex. Moreover, the transmission of the ACK packet hereupon is not limited to the transmission of the ACK packet alone, but includes the case where the ACK packet is multiplexed by the other kinds of packets such as an RTS packet, a CTS packet and a Data packet to be transmitted.

Hereupon, it is necessary for a high-grade communication station being a communication party to detect that the values of spoofed Rate and Length described in the first portion are spoofed for performing a correct reception operation without performing any malfunctions based on the spoofed Rate and Length. That is, for realizing the mechanism of the ad-hoc compatibility in a high-grade communication station, it is needed for each high-grade communication station to recognize that the information of a packet length and a transmission rate described in the first portion is spoofed. Moreover, for preventing the conventional stations from knowing that the information is spoofed, only the high-grade communication stations mutually recognize the fact, and the first communication stations should operate in accordance with the description in the first portion.

In the embodiment shown in FIG. 3, for example, a flag of one bit indicating the existence of the spoofing is prepared in the reserved area (Reserve) of the SIGNAL portion. Then, when a high-grade communication station detect that the information of the packet length and the rate is spoofed by means of the flag in the first portion, the high-grade communication station shifts to the corresponding high grade rate mode, and can decode actual data by receiving the residual packet, i.e. a high-grade decoding portion. In this case, the high-grade communication station destroys the information of the packet length and the rate read from the SIGNAL portion of the received packet.

In the case where only a single communication method (communication mode) is defined in the second communication method for performing the packet transmission and the reception at a high-speed transmission rate, the shift of the communication method can be specified only by means of the spoofed flag of one bit as described above with FIG. 3 being referred to. On the contrary, in the case where the second communication method includes a plurality of transmission modes, it becomes impossible to specify a transmission mode only by means of the spoofed flag of one bit.

Figure 4:
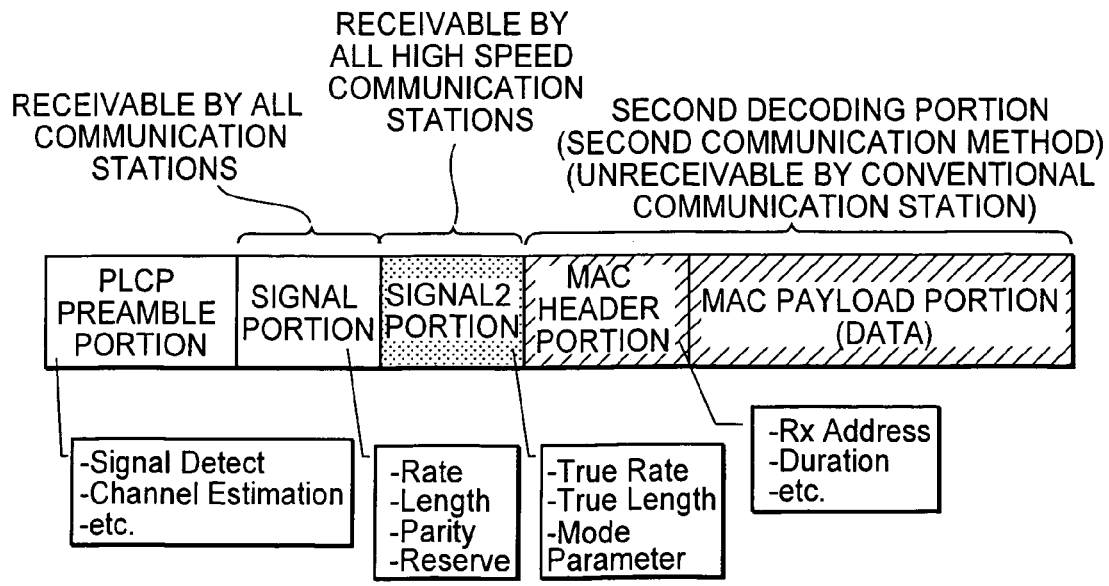
FIG. 4 is view schematically showing a variation of a packet structure in the wireless network according to the present invention.

The simplest way of specifying one of a plurality of transmission modes as described above is to add a field for specifying a transmission mode in a packet. FIG. 4 shows a variation of the packet structure shown in FIG. 3. In the shown example, a SIGNAL-2 portion (high throughput (HT) PHY portion) is furthermore added after the SIGNAL portion in a packet transmitted according to the second communication method.

In the shown example, the SIGNAL-2 portion includes a field describing a true transmission rate (True Rate) and a true packet length (True Length), and a field describing a mode parameter value (Mode Parameter). Because the SIGNAL-2 portion is transmitted at a fixed transmission rate at which all high-grade communication stations can perform a reception, the high-grade communication station which has received the packet performs an reception operation in accordance with the true transmission rate (True Rate) and the true packet length (True Length). Moreover, conventional stations cannot decode the SIGNAL-2 portion, and set their reception duration on the basis of the rate and the length described in the SIGNAL portion.

Now, it is needed for each of the high-grade communication stations to recognize the spoofing in the way that the conventional stations cannot know the spoofing of the transmission rate and the packet length in the SIGNAL portion, and the conventional stations should operate in conformity with the description in the SIGNAL portion. For the sake of this, a packet is transmitted according to the communication method in which all high-grade communication stations can decode the SIGNAL-2 portion (HT-SIGNAL portion) as the second communication method portion and the conventional stations cannot decode the SIGNAL-2 portion.

For example, the SIGNAL-2 portion is transmitted at a low transmission rate of about 6 Mbps for all high-grade communication stations can receive the SIGNAL-2 portion, and a modulation processing of the SIGNAL-2 portion is performed according to a modulation system which each of the high-grade communication stations know but the first communication stations do not know. Thereby, only the high-grade communication stations can demodulate the SIGNAL portion to recognize that the SIGNAL portion is spoofed.

In such a case, a high-grade communication station receiving the packet tries to decode the SIGNAL-2 portion in accordance with both of the first communication method and a communication method which the first communication stations cannot decode, and can recognize that the SIGNAL portion is spoofed by the fact that the SIGNAL-2 portion can be decoded according to the latter method. Then, the high-grade communication station can perform the reception processing of the second portion according to the communication mode obtained from the SIGNAL-2 portion.

The SIGNAL-2 portion is located before the MAC frame being the second portion. Consequently, in the case where the information of a packet length and a transmission rate is spoofed in the first portion, a high-grade communication station receiving the packet can perform the reception operation of the second portion after the SIGNAL-2 portion on the basis of the true packet length (True Length) and the true transmission rate (True Rate) describe in the SIGNAL-2 portion.

A high-grade communication station performing a packet transmission modulates the second communication method portion according to a modulation system known only by each of the high-grade communication stations, and thereby it can be realized that all of the high-grade communication stations can decode the second communication method portion, and that conventional stations cannot decode the second communication method portion. For example, in case of performing a phase modulation of the SIGNAL-2 portion such as BPSK, a phase difference θ, which second communication stations jointly own, may be given to a signal point location, or a signal point may be translated by a known quantity Δd. On the other hand, a high-grade communication station receiving the packet performs the phase demodulation of the packet in consideration of the phase shift of the signal point location such as the phase difference −θ or the movement quantity −Δd. Then, the high-grade communication station can know the spoofing of the first portion by the fact that the SIGNAL-2 portion could be decoded.

Figure 16:
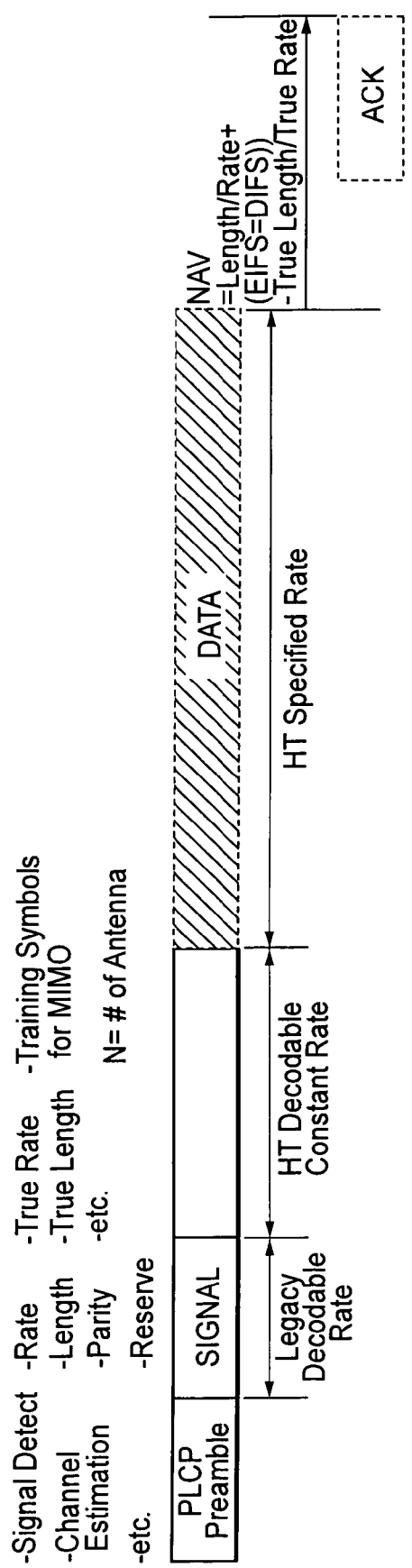
FIG. 16 is a view showing one example of the frame configuration of a packet transmitted according to the second communication method.

FIG. 16 shows an example of the inner structure of the wireless reception unit 110 in this case. The wireless reception unit 110 is composed of an RF unit and a PHY portion. The PHY portion is composed of a first demodulation unit, a second demodulation unit, and a reception processing unit for processing reception data which correctly demodulated by either of these demodulation units.

The reception processing unit notifies the first demodulation unit of the modulation system (transmission rate) obtained from the first portion. The first demodulation unit supposes that the first portion is not spoofed, and demodulates the signal after that according to the modulation system (transmission rate) described in the first portion by the signal point location same as that of the first portion.

The second demodulation unit supposes that the SIGNAL-2 portion follows the first portion, and demodulates the SIGNAL-2 portion according to a known modulation system (transmission rate) by the signal point location whose phase has been rotated by 90 degrees.

The SIGNAL-2 portion has a fixed length. Consequently, when it becomes clear that the portion is the SIGNAL-2 portion after the demodulation of a predetermined length of the SIGNAL-2 portion, it is found that the first portion is spoofed. If not so, it is found that the first portion is not spoofed. In the latter case, the second demodulation unit continues the demodulate at the unrotated signal point location by the first demodulation unit. Thereby, it is possible to suggest whether the spoofing is performed or not without providing any spoofed flag in the reserved area (Reserve) of the first portion.

Incidentally, a modulation system for providing a phase difference to a signal point on a constellation to perform mapping is, for example, disclosed in Japanese Unexamined Patent Publication No. Hei 11-146025.

The high-grade communication station can decode the second portion (see DATA portion of FIG. 16) in principle, as described above. However, it is supposed that the second portion of high-speed rate cannot be decoded when the distance between communication terminals is large, or when a MIMO communication is performed. In such cases, it is possible to estimate how long a packet transmission terminal directs the other terminals to restrain their transmissions by using the first portion (SIGNAL portion in FIG. 16) and the second communication method portion (HT-SIGNAL portion in FIG. 16), both modulated at a fixed low-speed rate.

The value of (packet length)/(transmission rate) calculated on the basis of the description in the SIGNAL portion as the first portion is the duration until the reception of ACK in FIG. 16 is completed. Moreover, the value of (True Length)/(True Rate) calculated on the basis of the HT-SIGNAL portion as the second communication method portion corresponds to the duration until the transmission of a true packet is completed. The difference between the two (Length)/(Rate) (by adding EIF−DIFS in FIG. 16) is a value corresponding to an NAV indicating how long the packet transmission terminal directs the other terminals to restrain their transmissions.

Further in the second communication system, the wideband transmission where adjacent 2 or more of the frequency channels are bundled, or a bandwidth of signal is expanded by 2 frequency channels can be considered.

Figure 18:
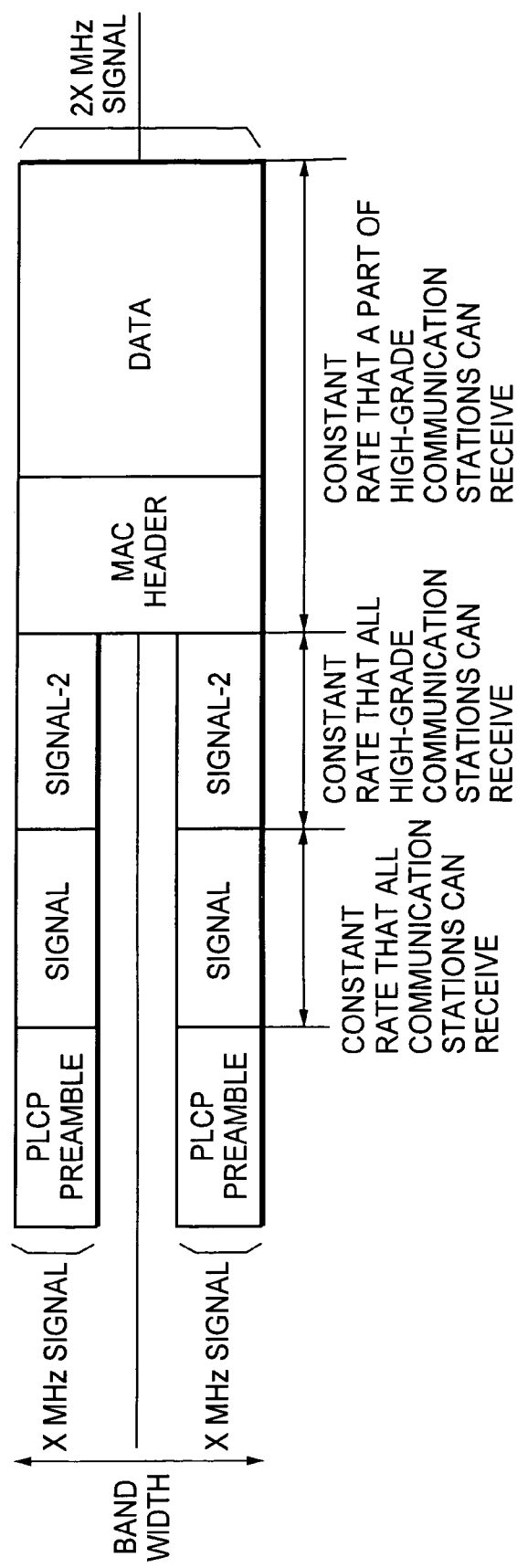
FIG. 18 is a view showing one example of a configuration of a packet in case of performing a wideband transmission where signal bandwidth is expanded by 2 channels.

In FIG. 18, an example of a packet configuration in case of performing a wideband transmission by expanding the band width of the signal by 2 frequency channels. In the example in the figure, a wideband transmission is performed by expanding the MAC frame portion to the 2X MHz in the communication system where 2 communication channels of X MHz band are prepared.

As described above, in case of expanding the bandwidth of signal, the header portion of the packet, that is, the PLCP preamble, the SIGNAL portion, and the SIGNAL-2 portion are sequentially transmitted in each X Mhz band.

When the packet as shown in FIG. 18 is transmitted, each of peripheral communication stations detects the PLCP preamble on the frequency channel which each is now tuning, and starts to receive the SIGNAL portion on this frequency channel.

The SIGNAL portion which is able to be received by all communication stations spoofs the information relating to the transmission rate and the packet length so that a value of (packet length)/(transmission rate) becomes equal to the duration where communication is hopefully stopped. As the result, the conventional station presets a packet length and a transmission rate which are different from actual, and performs the reception corresponding to the time of this duration. The actual packet is not transmitted during the (packet length)/(transmission rate), but the conventional communication station does not start the transmission during the interval corresponding to this duration, refrains the transmission during the duration where communication is hopefully stopped, resultantly, and continues the reception.

Moreover, the high-grade communication station performs the reception of the SIGNAL-2 portion after the SIGNAL portion on the frequency channel where the PCLP preamble is detected. The SIGNAL-2 portion includes a field describing the actual transmission rate (True Rate) and the actual packet length (True Length), and a field describing parameter values of the mode (Mode Parameter). The SIGNAL-2 portion is transmitted at a constant transmission rate which all of the high-grade communication stations are able to receive, so that the high-grade communication station that receives the SIGNAL-2 portion performs the reception operation for the MAC frame (that is, MAC header and data portion) onward based on the actual transmission rate (True Rate) and the actual packet length (True Length) obtained from the SIGNAL-2 portion. On the contrary, the conventional station is not able to decode the SIGNAL-2 portion (as mentioned before), and sets the a duration for reception based on the Rate and the Length described in the SIGNAL portion.

In this case, all high-grade communication station not always support the communication mode defined in the same standard specification. For example, there is a case where the high-grade communication station being a reception side of the packet is not able to perform the reception operation of the MAC frame onward due to the difference (EIF−DIFS is added in FIG. 16) in the supported communication mode. Such high-grade communication station that is not able to receive the MAC frame obtains by taking the difference between the (packet length)/(transmission rate) calculated base on description in the SIGNAL portion and the (True Length)/(True Rate) calculated based on the SIGNAL-2 portion, and refrains the transmission of the packet by setting the NAV for the duration.

In addition, there is a case where even high-grade communication station is able to receive in one of X MHz band, but is not able to receive if the bandwidth of the signal is expanded to 2X MHz. Such problem tends to occur due to the difference in each country in frequency band allocated in a wireless LAN, for example. The high-grade communication station that is not able to receive the MAC frame refrains the packet transmitting operation for a predetermined duration. Namely, such high-grade communication station that is not able to receive the MAC frame obtains by taking the difference between the (packet length)/(transmission rate) calculated base on description in the SIGNAL portion and the (True Length)/(True Rate) calculated based on the SIGNAL-2 portion, and refrains the transmission of the packet by setting the NAV for the duration.

As described above, both a conventional station that receives the SIGNAL portion on a certain frequency channel and a high-grade communication station that does not support the bandwidth and the communication mode described in the SIGNAL-2 portion refrain the packet transmitting operation on the band for the duration corresponding to the Duration described in the SIGNAL portion or the duration corresponding to the Duration obtained based on the description in both the SIGNAL portion and the SIGNAL-2 portion. In FIG. 19, there is shown a condition where a communication station receiving the channel A receives the SIGNAL portion and the SIGNAL-2 portion transmitted on the channel A, and refrains the transmission operation for a predetermined duration.

The method of adding the field (SIGNAL-2 portion or HT-SIGNAL portion) as shown in FIG. 4 for specifying a transmission mode to a packet for enabling the mutual notification of the transmission mode among high-grade communication stations is simple, but the decrease of the overhead and the communication efficiency caused by the transmission data becomes a problem.

Now, as described above, in the case where RATE and Length in the SIGNAL portion are set in a pseudo-way, there are a plurality of spoofed combinations of the packet length and the rate for indicating the same period of time. For example, because the period of time necessary for transmitting 1200 bits at 6 Mbps and the period of time necessary for transmitting 2400 bits at 12 Mbps are the same, a reception station does not care which period of time is set as Rate.

However, in the case where a high-grade communication station uses a high-speed transmission rate which the first communication method cannot deal with, it is necessary that a value corresponding to the first communication method is spoofed in the transmission rate (Rate) field of the SIGNAL portion for enabling the conventional stations to decode the first portion correctly. In this case, it is needed to perform the spoofing by adjusting the value of the packet length (Length) in order to be able to obtain a desired Duration value according to the spoofed transmission rate (Rate) value.

In the example shown in FIG. 3, in the case where a spoofed flag is set in the SIGNAL portion being the first portion, the high-grade communication stations destroy the information of Rate in the SIGNAL portion as being spoofed. On the other hand, in the example shown in FIG. 4, it is possible to indicate which mode the successive high-grade modulation system takes by using the information of True Rate described in the SIGNAL-2 portion.

FIG. 5 shows a description example of the Rate field in the IEEE 802.11a. As shown in FIG. 5, the IEEE 802.11a sets eight transmission rates of 6 Mbps, 9 Mbps, 12 Mbps, 18 Mbps, 24 Mbps, 36 Mbps, 48 Mbps and 54 Mbps. In the Rate field, transmission rates are expressed by means of four bits. When a spoofed flag is set, it is possible to assign the definition of the Rate field on a standard to the specifying of an actual high-speed transfer mode.

In the example shown in FIG. 5, though the Rate field is four bits, all of the LSB's are set to be 1. Consequently, it is possible to specify each of 3 bits, i.e. eight modes can be specified. Moreover, the IEEE 802.11b being a conventional standard includes the least upper bound of settable packet length (Length). Consequently, when a higher rank rate is used for spoofing, the Length field is lacked. Then, there is a problem in which a sufficient value of Duration cannot be secured for (packet length (Length))/(rate (Rate)) (namely, an NAV of a long duration cannot be spoofed). Accordingly, actually four rates of 6 Mbps, 9 Mbps, 12 Mbps, and 18 Mbps are used for the specification of the high-speed transfer mode for enabling the setting of large value Duration (=(Length)/(Rate)). Because there is the possibility that there is a conventional station which, when a Length exceeding the least upper bound is set, recognizes the information as an error and destroys the information, the definition is provided (the IEEE 802.11a indicates the Length information by bits, and the IEEE 802.11b indicates the Length information by periods of time).

Incidentally, because the IEEE 802.11n supposes a system using a multi-input multi-output (MIMO) communication and a system expanding a communication use band as a high-speed transmission, a plurality of transmission modes can exist according to the combination of the number of antennas used for the MIMO communications and communication use bands. In such a case, the transmission mode may be notified among the high-grade communication stations by means of any one of the above-described methods.

Hereupon, the MIMO communication indicates a technique for achieving the increase of a transmission capacity and the improvement of a communication speed by realizing space division multiplexing, i.e. a plurality of logically independent transmission paths, by providing a plurality of antenna elements both at the transmitter side and at the receiver side. Because the MIMO communication uses the space division multiplexing, frequency usability is good.

Next, a reception processing procedure of the wireless communication apparatus 100 in the wireless network according to the present embodiment is described.

Figure 6:
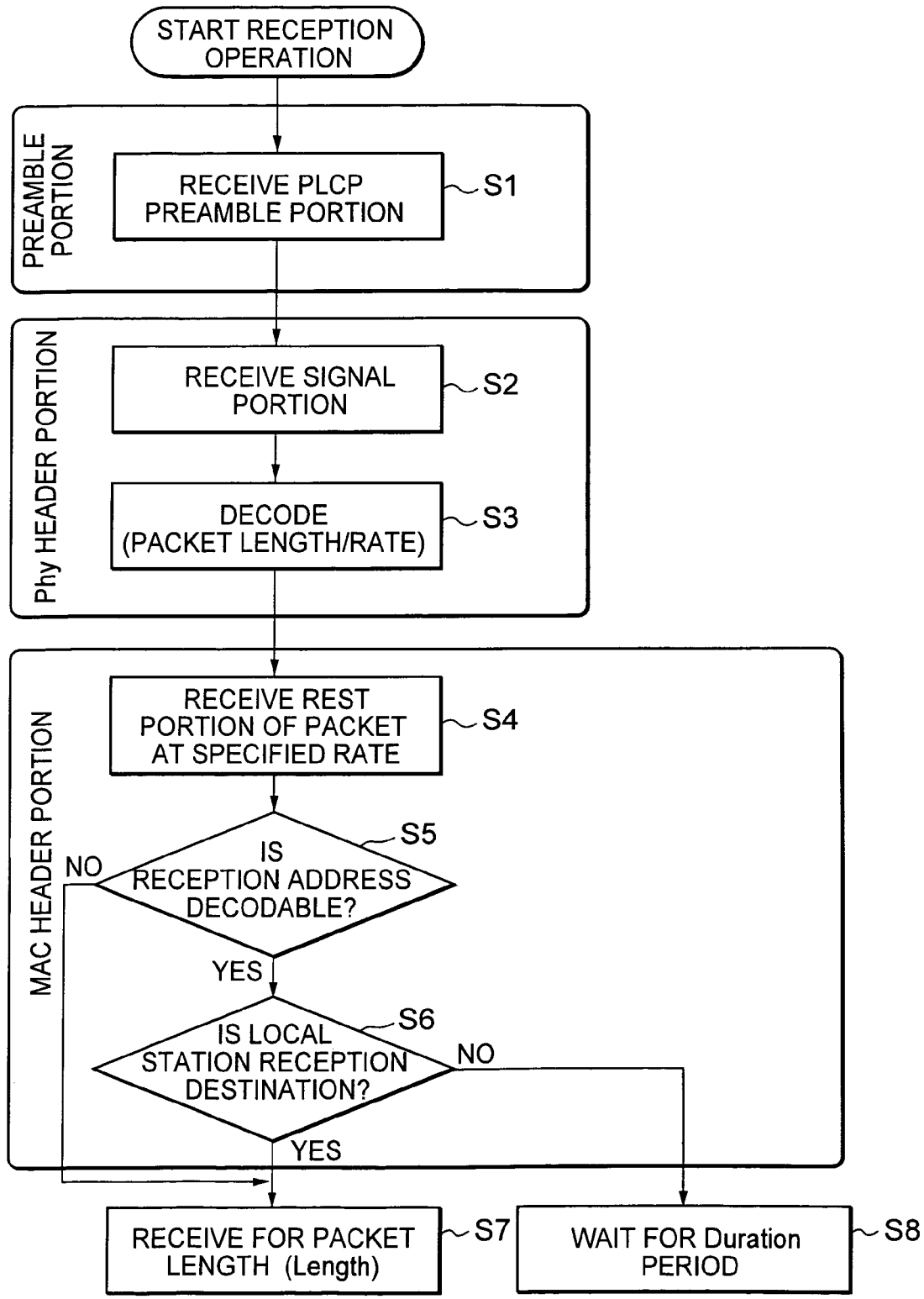
FIG. 6 is a flowchart showing a reception processing procedure in the case where a wireless communication apparatus 100 operates as a conventional station.

FIG. 6 shows a reception processing procedure in the form of a flowchart in the case where the wireless communication apparatus 100 operates as a conventional station. Such a processing procedure is actually realized in a form in which the central control unit 103 executes the instruction executing program stored in the information storage unit 113.

When the wireless communication apparatus 100 receives a PLCP preamble portion in step S1, the wireless communication apparatus 100 successively receives the SIGNAL portion of the PHY layer in step S2.

Then, the wireless communication apparatus 100 decodes the information of the transmission rate (Rate) and the packet length (Length) described in the SIGNAL portion in step S3, and calculates the reception duration determined by (packet length)/(transmission rate).

Next, the wireless communication apparatus 100 receives a MAC header portion at the transmission rate specified by RATE in the SIGNAL portion in step S4. Now, when the wireless communication apparatus can decode the reception destination address on the basis of the MAC header in step S5, the wireless communication apparatus 100 compares the reception destination address with the local station address in step S6. Then, when both the addresses coincide with each other, the wireless communication apparatus 100 performs the reception processing for the packet length specified by the Length of the SIGNAL portion in step S7.

Moreover, when the reception destination address and the local station address do not coincide with each other in step S6, the wireless communication apparatus 100 sets an NAV for the Duration determined by (packet length)/(transmission rate), and restrains its transmission in step S8.

Moreover, when the wireless communication apparatus 100 cannot decode the reception destination address on the basis of the MAC header in step S5, the wireless communication apparatus 100 performs reception processing for a packet length specified by the Length of the SIGNAL portion in step S7.

Figure 7:
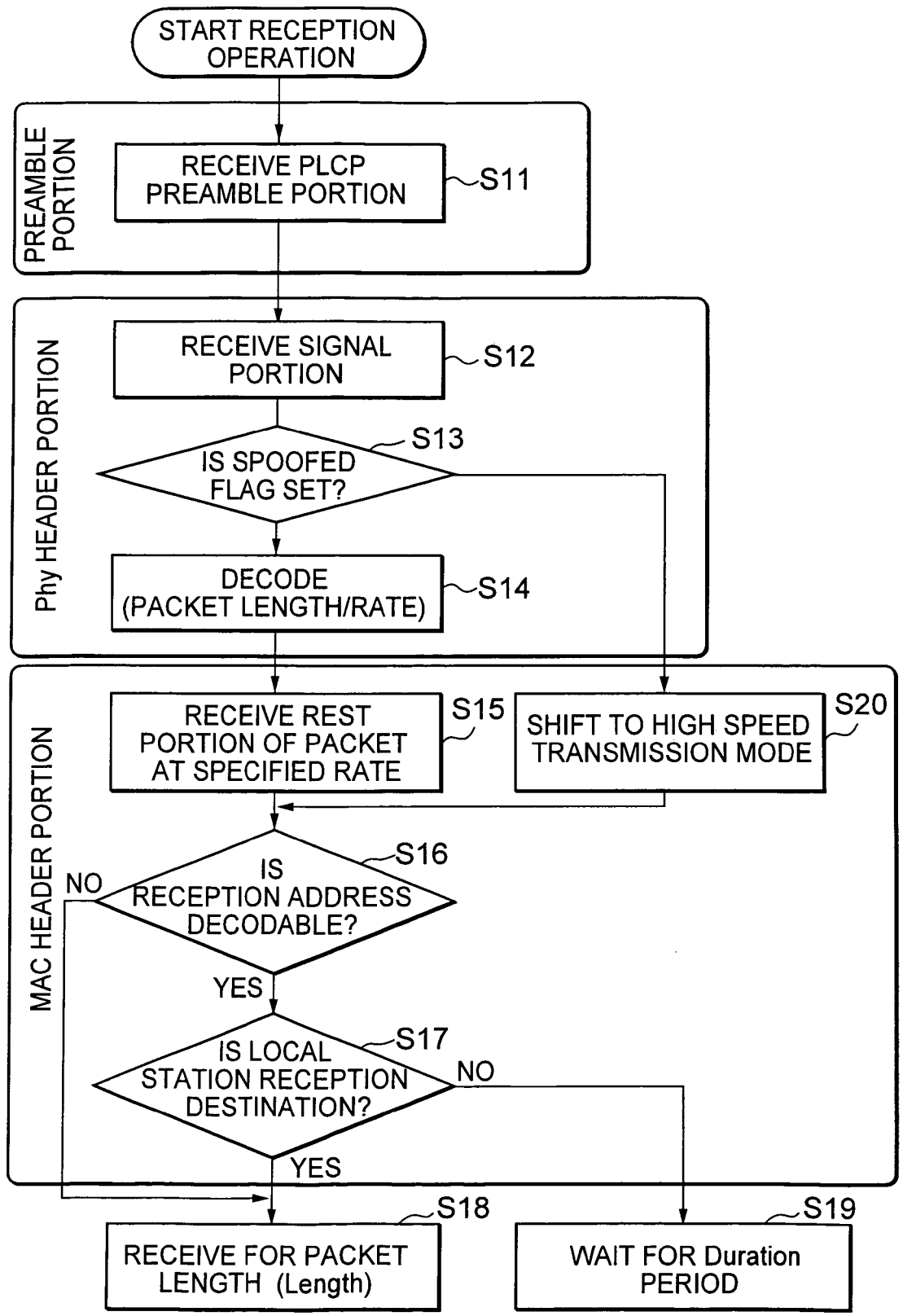
FIG. 7 is a flowchart showing a reception processing procedure in the case where the wireless communication apparatus 100 operates as a high-grade communication station.

Moreover, FIG. 7 shows a reception processing procedure in the form of a flowchart when the wireless communication apparatus 100 operates as a high-grade communication station. Such a processing procedure is actually realized in the form in which the central control unit 103 executes the instruction executing program stored in the information storage unit 113.

When the wireless communication apparatus 100 receives a PLCP preamble portion in step S11, the wireless communication apparatus 100 successively receives the SIGNAL portion of the PHY layer in step S12.

Then, the wireless communication apparatus 100, for example, refers to the spoofed flag in the Reserve field to judge whether the information of the transmission rate (Rate) and the packet length (Length) is spoofed or not in step S13.

Alternatively, the wireless communication apparatus 100 judges whether the SIGNAL-2 portion is provided successively to the SIGNAL portion or not. Thereby, the wireless communication apparatus judges whether the information of the transmission rate (Rate) and the packet length (Length) is spoofed or not in step S13. In this case, the wireless communication apparatus 100 tries to demodulate the SIGNAL-2 portion according to the modulation system which each of the high-grade communication stations knows but the first communication stations do not know in parallel with the wireless communication apparatus 100 demodulates the signal after the SIGNAL-2 portion according to the modulation system (transmission rate) described in the SIGNAL portion. Then, the wireless communication apparatus 100 can recognized that the SIGNAL portion is spoofed on the basis of the fact the wireless communication apparatus 100 can decode the SIGNAL-2 portion according to the latter modulation system.

Now, when the spoofed flag is not set, the wireless communication apparatus 100 can recognize that the packet is transmitted at the transmission rate at which the conventional stations can receive the packet. Then, the wireless communication apparatus 100 decodes the information of the transmission rate (Rate) and the packet length (Length) described in the SIGNAL portion in step S14, and calculates the reception duration determined by (packet length)/(transmission rate).

Next, the wireless communication apparatus 100 receives the MAC header portion at the transmission rate specified by the RATE in the SIGNAL portion in step S15. Now, when the wireless communication apparatus can decode the reception destination address on the basis of the MAC header in step S16, the wireless communication apparatus 100 compares the reception destination address with the local station address in step S17. Then, when both the addresses coincide with each other, the wireless communication apparatus 100 performs the reception processing for the packet length specified by the Length of the SIGNAL portion in step S18.

Moreover, when the reception destination address and the local station address do not coincide with each other in step S17, the wireless communication apparatus 100 sets an NAV for the Duration specified by the MAC header, and restrains its transmission in step S19.

Moreover, when the wireless communication apparatus 100 cannot decode the reception destination address on the basis of the MAC header in step S16, the wireless communication apparatus 100 performs reception processing for a packet length specified by the Length of the SIGNAL portion in step S18.

On the other hand, when the wireless communication apparatus 100 judges that the second portion of the packet is transmitted at the transmission rate at which only the high-grade communication stations can receive the packet on the basis of the setting of the spoofed flag in the SIGNAL portion or on the basis of the provision of the SIGNAL-2 portion in step S13, the wireless communication apparatus 100 shifts to a high-speed transmission mode in step S20, and receives the MAC header portion in step S15. The wireless communication apparatus 100 performs the reception processing according to, for example, True Rate and True Length described in the SIGNAL-2 portion.

Now, when the wireless communication apparatus 100 can decode the reception destination address on the basis of the MAC header in step S16, the wireless communication apparatus 100 compares the reception destination address with the local station address in step S17. Then, when both the addresses coincide with each other, the wireless communication apparatus 100 performs the reception processing for the packet length specified by the Length of the SIGNAL portion in step S18.

Moreover, when the reception destination address and the local station address do not coincide with each other in step S17, the wireless communication apparatus 100 sets an NAV for the Duration determined by (packet length)/(transmission rate), and restrains its transmission in step S19.

In addition, another example of the reception processing sequences wherein the wireless communication apparatus 100 operates as a high-grade communication station is shown with a flowchart. These processing sequences are actually performed with a mode where a central control unit 103 executes the execution instruction program in an information storage unit 113.

When the PCLP preamble portion is received in step S21, then the SIGNAL portion of the PHY layer is received.

Then, with reference to the spoofed flag of the Reserve field, for example, it is judged if the information of the transmission rate (Rate) and the packet length (Length) described in the SIGNAL portion is spoofed or not. In this case, if the SIGNAL portion is spoofed, the SIGNAL-2 portion will follow.

Figure 15:
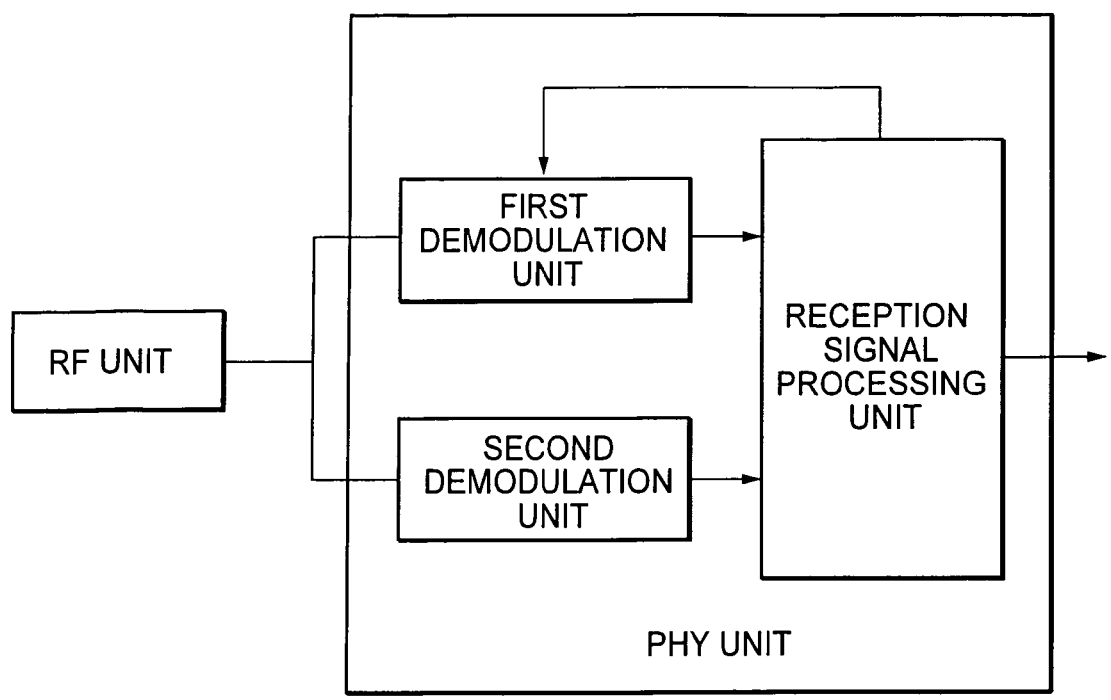
FIG. 15 is a view showing one example of the internal configuration of a wireless reception unit 110 of a high-grade communication station capable of decoding a SIGNAL-2 portion.

Alternatively, it is able to judge if the information of the transmission rate (Rate) and the packet length (Length) is spoofed or not in step S23 by judging the if the SIGNAL-2 portion is provided subsequently to the SIGNAL portion. In this case, the demodulation of the SIGNAL-2 portion is tried by the modulation system which is known to the high-grade communication but not known to the communication station #1 in parallel with the demodulation of the signal onward with the modulation system (transmission rate) as described in the SIGNAL portion (see FIG. 15). If decoded by the latter, it is able to be recognized that the SIGNAL portion is spoofed and the SIGNAL-2 portion will follow.

In step 23, if it is judged that the spoofed flag is not set, namely, the SIGNAL portion is not spoofed, it is recognized that the packet is transmitted at the transmission rate which the conventional station is able to receive. Accordingly, the information of the transmission rate (Rate) and the packet length (Length) described in the SIGNAL portion is decoded, and calculates the packet transmission waiting duration defined by (packet length)/(transmission rate). Then, The MAC header portion is received with the transmission rate designated by the RATE in the SIGNAL portion in step S27.

On the contrary, in step S23, if it is judged that the spoofed flag is set, namely, the SIGNAL portion is spoofed, the reception of the SIGNAL-2 portion followed after the SIGNAL portion is performed in step S24. In addition, it is judged if the local station correspond to the actual transmission mode described in the SIGNAL-2 portion in step S25.

As described before, even a high-grade communication station not always support all transmission rates defined in the upper specification such as the IEEE 802.11g. It is probable that even the high-grade communication station does not correspond to the expansion of bandwidth of signal due to the difference in frequency allocation of wireless LAN at respective countries. In this case, the result of the judgement in step S25 becomes negative, the processing proceeds to step S31, and the transmission of packet is refrained during the packet transmission waiting duration calculated by (Packet Length)/(Transmission Rate) based on the information of the transmission rate (Rate) and the packet length (Length) described in the SIGNAL portion.

On the contrary, the result of the judgement in step S25 becomes affirmative, namely, the local station does correspond to the actual transmission mode described in the SIGNAL-2 portion, The MAC header portion is received with the transmission mode specified in the SIGNAL-2 portion in step S26.

When the MAC header portion is received in step S26 or step S27, it is judged if the reception address described in the MAC header is decodable or not in step S28. If the reception address is decodable with the MAC address in step S28, further the reception address and the local address are compared in step S29. If the both addresses are the same (that is, the local station is transmitting the packet), the reception processing is performed by the actual packet length specified by the True Length in the SIGNAL-2 portion in step S30.

Further in the case where the reception address is not able to be decoded with the MAC header in step S28, or the reception address and the local address are not the same (that is, the local station is not transmitting the packet), the processing proceeds to step S31, and the transmission of packet is refrained during the packet transmission waiting duration calculated by (Packet Length)/(Transmission Rate) based on the information of the transmission rate (Rate) and the packet length (Length) described in the SIGNAL portion. Thus, the high-grade communication station is able to avoid collision of packet even when it is not able to receive whole of the packet.

Lastly, a communication operation in the wireless network according to the present embodiment is described. In the wireless network, conventional stations in conformity with the conventional IEEE 802.11b and high-grade communication stations in conformity with the IEEE 802.11g corresponding to a high-speed edition standard using the same band as that of the IEEE 802.11b intermixedly operates.

Figure 8:
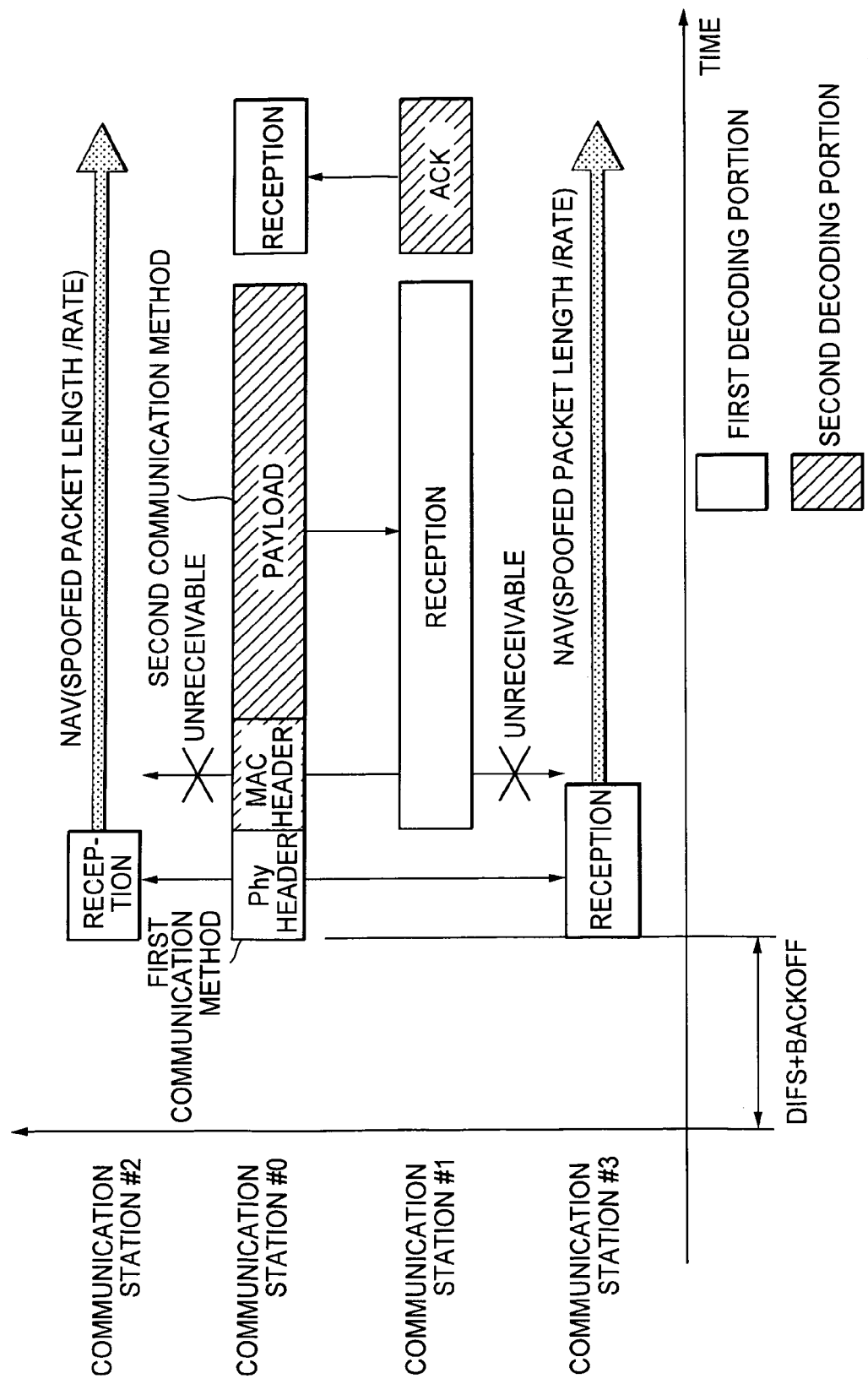
FIG. 8 is a view showing one of communication operation examples based on CSMA/CA according to the present invention.

FIG. 8 shows a communication operation example based on CSMA/CA. In the shown example, there are four communication stations #0 to #3 in a communication environment. Among them, the communication station #0 and the communication station #2 are supposed to be high-grade communication stations, and the communication station #2 and the communication station #3 are supposed to be conventional stations (or, a high-grade communication station which does not support the transmission mode).

Each communication station having transmission data monitors a medium state for a predetermined inter frame space DIFS from the last detection of a packet. When any media are clear, namely when there are no transmission signals, the communication station performs random backoff. Furthermore, when there are no transmission signals also in this period, a transmission right is given to the communication station. In the shown example, the communication station #0 setting the random backoff shorter than that of the other peripheral stations acquires the transmission right, and can start a data transmission to the communication station #1 similarly as a high-grade communication station.

At the time of the data transmission, the transmission source communication station #0 transmits a first portion corresponding to the PHY header according to a first communication method, which all communication stations can receive, and transmits a second portion corresponding to the MAC frame according to a second communication method, which only the high-grade communication stations can receive. Then, the transmission source communication station #0 performs the spoofing of the information of the transmission rate (Rate) and the packet length (Length) in the SIGNAL portion of the PHY header in order that the value of (packet length)/(rate) may be equal to the duration until an ACK packet for which communications are desired to be stopped.

Alternatively, the transmission source communication station #0 transmits the SIGNAL portion in the PHY header according to the first communication method, which all communication stations can receive, and successively transmits the SIGNAL-2 portion modulated according to a modulation system, which each high-grade communication station knows but the first communication stations do not know. After that, the transmission source communication station #0 transmits the second portion corresponding to the MAC frame according to the second communication method, which only the high-grade communication stations can receive. Then, the transmission source communication station #0 performs the spoofing of the information of the transmission rate (Rate) and the packet length (Length) in the SIGNAL portion of the PHY header in order that the value of (packet length)/(rate) may equal to the duration until the ACK packet for which communications are desired to be stopped.

The communication station #2 and the communication station #3 as the conventional stations can hear the SIGNAL portion of the packet from the communication station #0, and set a packet length and a transmission rate different from the actual state to perform reception for a period of time corresponding to the duration until the transmission of the ACK packet ends. The data packet from the communication station #0 is not transmitted for a period of (packet length)/(rate), but the communication station #2 and the communication station #3 try to receive the data packet and do not start any transmissions. As a result, the communication stations #2 and #3 restrain their transmissions. Moreover, because the rate and the packet length are different from the real transmission of the packet, the rate and the packet cannot be normally decoded, and the communication station #2 and the communication station #3 destroy the packet.

Moreover, in the reserved area (Reserve) of the SIGNAL portion, a spoofed flag indicating the spoofing of the information of the transmission rate (Rate) and the packet length (Length) of the SIGNAL portion is set. In this case, the communication mode of a MAC frame, i.e. the true transmission rate (True Rate) and the true packet length (True Length), is indicated by a combination of Rate and Length. Alternatively, by providing the SIGNAL-2 portion, the spoofing of the information of the transmission rate (Rate) and the packet length (Length) of the SIGNAL portion is indicated, and the true transmission rate (True Rate) and the true packet length (True Length) of the MAC frame are described.

The communication station #1 being the communication party is a high-grade communication station, and detects the spoofing of the information of a packet length and a rate of a SIGNAL portion on the basis of the spoofed flag. Alternatively, the communication station #1 detects the spoofing of the information of the packet length and the rate of a SIGNAL portion on the basis of the success of the decoding of the SIGNAL-2 portion. Then, the communication station #1 destroys the reception result of the SIGNAL portion in response to the detection of the spoofing. Furthermore, the communication station #1 receives the MAC frame as the successive second portion at the transmission rate indicated by the SIGNAL portion or the SIGNAL-2 portion, and performs the reception operation of the data addressed to the local station for the duration of Duration described in the MAC header. Then, when the data reception is completed, the communication station #1 returns an ACK packet to the data transmission source communication station #0.

Further, when the communication stations #2 and #3 are not conventional stations, but high-grade communication stations which do not support the transmission mode, the communication stations #2 and #3 obtain values corresponding to the duration by taking the difference (EIF−DIFS is added in the FIG. 16) between the (packet length)/(transmission rate) calculated based on the description in the SIGNAL portion of the received packet and the (true length)/(true rate) calculated based on the SIGNAL-2 portion, and refrains the transmission of the packet by setting NAV at the duration.

In such a way, according to the CSMA/CA system, contention is avoided while a single communication station acquires a transmission right, and any collisions can be avoided by the stop of peripheral stations' data transmission operations during a data communication operation. Moreover, in case of inexistence of the concealed terminal problem, peripheral conventional communication stations (and the high-grade communication station which does not support the transmission mode) can set NAV's to avoid collisions without passing through the RTS/CTS procedure as shown in the drawings. Thereby, overhead can be reduced.

Figure 9:
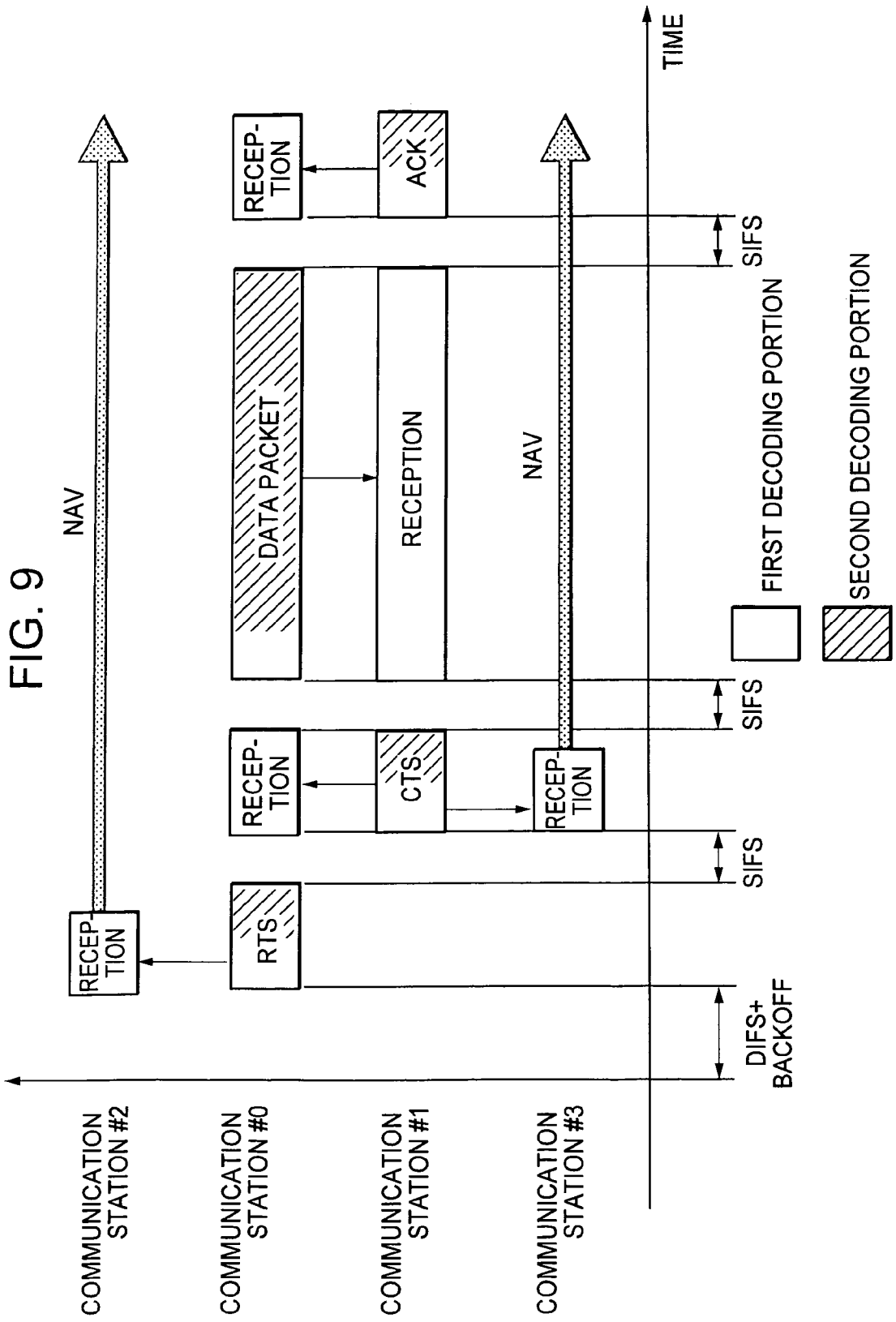
FIG. 9 is a view showing one of communication operation examples based on RTS/CTS according to the present invention.

FIG. 9 shows a communication operation example based on RTS/CTS. In the shown example, there are four communication stations #0 to #3 in a communication environment. Among them, the communication station #0 and the communication station #2 are supposed to be high-grade communication stations, and the communication station #2 and the communication station #3 are supposed to be conventional stations (or the high-grade communication station which does not support the transmission mode).

Each communication station is in the following communication state. That is, the communication station #2 can communicate with the adjacent communication station #0, and the communication station #0 can communicate with the adjacent communication stations #1 and #2. The communication station #1 can communicate with the adjacent communication stations #0 and #3. The communication station #3 can communicate with the adjacent communication station #1. Furthermore, the communication station #2 is a concealed terminal for the communication station #1, and the communication station #3 is a concealed terminal for the communication station #0.

Each communication station having transmission data monitors a medium state for a predetermined inter frame space DIFS from the last detection of a packet. When any media are clear, namely when there are no transmission signals, the communication station performs random backoff. Furthermore, when there are no transmission signals also in this period, a transmission right is given to the communication station. In the shown example, the communication station #0 setting the random backoff shorter than that of the other peripheral stations acquires the transmission right, and can start a data transmission to the communication station #1 similarly as a high-grade communication station after the inter frame space DIFS.

That is, the data transmitting communication station #0 transmits a transmission request packet (RTS) to the communication station #1. To this transmission, the reception destination communication station #1 returns a confirmation note (CTS) to the communication station #0 after the shorter inter frame space SIFS (Short IFS).

Now, at the time of an RTS packet, the communication station #0 transmits a first portion corresponding to the PHY header according to a first communication method, which all communication stations can receive, and transmits a second portion corresponding to the MAC frame according to a second communication method, which only the high-grade communication stations can receive. Then, the transmission source communication station #0 performs the spoofing of the information of the transmission rate (Rate) and the packet length (Length) in the SIGNAL portion of the PHY header in order that the value of (packet length)/(rate) may be equal to the duration until an ACK packet for which communications are desired to be stopped.

Alternatively, the transmission source communication station #0 transmits the SIGNAL portion in the PHY header according to the first communication method, which all communication stations can receive, and successively transmits the SIGNAL-2 portion modulated according to a modulation system, which each high-grade communication station knows but the first communication stations do not know. After that, the communication station #0 transmits the second portion corresponding to the MAC frame according to the second communication method, which only the high-grade communication stations can receive. Then, the communication station #0 performs the spoofing of the information of the transmission rate (Rate) and the packet length (Length) in the SIGNAL portion of the PHY header in order that the value of (packet length)/(rate) may equal to the duration until the ACK packet for which communications are desired to be stopped.

The communication station #2 as a conventional station can hear the SIGNAL portion of the RTS packet from the communication station #0, and set a packet length and a transmission rate different from the actual state to perform a reception operation for a period of time corresponding to (packet length)/(rate). The RTS packet from the communication station #0 is not transmitted for a period of (packet length)/(rate), but the communication station #2 tries to receive the data packet and do not start any transmissions. As a result, the communication station #2 restrains its transmission until the transmission of the ACK packet is completed. Moreover, because the rate and the packet length are different from the real transmission of the packet, the rate and the packet cannot be normally decoded, and the communication station #2 destroys the packet to transmitted according to the second communication method after that.

Moreover, the reception destination communication station #1 transmits the first portion corresponding to the PHY header according to the first communication method, which all communication station can receive, at the time of a transmission of a CTS packet, and transmits the second portion corresponding to the MAC frame according to the second communication method, which only the high-grade communication stations can receive. Then, the communication station #1 performs the spoofing of the information of the transmission rate (Rate) and the packet length (Length) in the SIGNAL portion of the PHY header in order that the value of (packet length)/(rate) may be equal to the duration until the ACK packet for which communications are desired to be stopped.

Alternatively, the reception destination communication station #1 transmits the SIGNAL portion in the PHY header according to the first communication method, which all communication stations can receive, and successively transmits the SIGNAL-2 portion modulated according to a modulation system which each high-grade communication station knows but the first communication stations do not know. After that, the reception destination communication station #1 transmits the second portion corresponding to the MAC frame according to the second communication method, which only the high-grade communication stations can receive. Then, the reception destination communication station #1 performs the spoofing of the information of the transmission rate (Rate) and the packet length (Length) in the SIGNAL portion of the PHY header in order that the value of (packet length)/(rate) may equal to the duration until the ACK packet for which communications are desired to be stopped.

The communication station #3 as the conventional station can hear the SIGNAL portion of the CTS packet from the communication station #1, and sets a packet length and a transmission rate different from the actual state to perform reception for a period of time corresponding to the duration until the transmission of the ACK packet ends. The CTS packet from the communication station #1 is not transmitted for a period of (packet length)/(rate), but the communication station #3 tries to receive the CTS packet and do not start any transmissions. As a result, the communication station #3 restrains its transmission until the completion of the transmission of the ACK packet. Moreover, because the rate and the packet length are different from the real transmission of the packet, the rate and the packet length cannot be normally decoded, and the communication station #3 destroy the packet to be transmitted after that according to the second communication method.

Then the communication station #0 starts the transmission of a data packet in response to the reception of the CTS packet after the inter frame space SIFS.

At the data transmission, the transmission source communication station #0 transmits the first portion corresponding to the PHY header according to the first communication method, which all communication stations can receive, and also transmits the second portion corresponding to the MAC frame according to the second communication method, which only the high-grade communication stations can receive. Then, the transmission source communication station #0 performs the spoofing of the information of the transmission rate (Rate) and the packet length (Length) in the SIGNAL portion of the PHY header, and sets a spoofed flag indicating the spoofing.

Alternatively, the transmission source communication station #0 transmits the SIGNAL portion in the PHY header according to the first communication method, which all communication stations can receive, and successively transmits the SIGNAL-2 portion modulated according to a modulation system, which each high-grade communication station knows but the first communication stations do not know. After that, the transmission source communication station #0 transmits the second portion corresponding to the MAC frame according to the second communication method, which only the high-grade communication stations can receive. Then, the transmission source communication station #0 performs the spoofing of the information of the transmission rate (Rate) and the packet length (Length) in the SIGNAL portion of the PHY header in order that the value of (packet length)/(rate) may equal to the duration until the ACK packet for which communications are desired to be stopped.

The communication station #1 detects the spoofing of the information of a packet length and a rate of a SIGNAL portion on the basis of the spoofed flag. Alternatively, the communication station #1 detects the spoofing of the information of the packet length and the rate of the SIGNAL portion on the basis of the success of the decoding of a SIGNAL-2 portion. Then, the communication station #1 destroys the reception result of the SIGNAL portion in response to the detection of the spoofing. Furthermore, the communication station #1 receives the MAC frame as the successive second portion at the transmission rate indicated by the SIGNAL portion or the SIGNAL-2 portion, and performs the reception operation of the data addressed to the local station for the duration of Duration described in the MAC header. Then, when the reception of the data packet from the communication station #0 is completed, the communication station #1 returns an ACK packet to the data transmission source communication station #0 after the inter frame space SIFS.

Further, when the communication stations #2 and #3 are not conventional stations, but high-grade communication stations which do not support the transmission mode, the communication stations #2 and #3 obtain values corresponding to the duration by taking the difference (EIF−DIFS is added in the FIG. 16) between the (packet length)/(transmission rate) calculated based on the description in the SIGNAL portion of the RTS packet or CTS Packet and the (true length)/(true rate)

calculated based on the SIGNAL-2 portion, and refrains the transmission of the packet by setting NAV at the duration.

As described above, when a peripheral conventional station to be a concealed terminal (or a high-grade communication station which does not support the transmission mode) receives at least one of the RTS and the CTS, the concealed terminal sets a transmission stop duration of the local station for the duration in which the data transmission based on the RTS/CTS procedure is expected to be performed, and thereby collisions can be avoided.

However, in the example shown in FIG. 9, in the case where the duration until the end of the RTS/CTS procedure (i.e. the duration until the ACK) is specified as the Duration, peripheral stations must wait until the last even if the RTS/CTS procedure is broken on the way, communication resources are wasted.

Accordingly, also a mechanism called as a Short NAV can be considered. In the Short NAV, each packet of the RTS, the CTS and data secures only the end of the next packet as the Duration. For example, the RTS packet is secured until the end of the CTS packet; the CTS packet is secured until the end of the data packet; the data packet is secured until the end of the ACK packet severally as the Duration. Consequently, even if the RTS/CTS procedure is broken halfway, the peripheral stations are not required to wait until the last.

Figure 10:
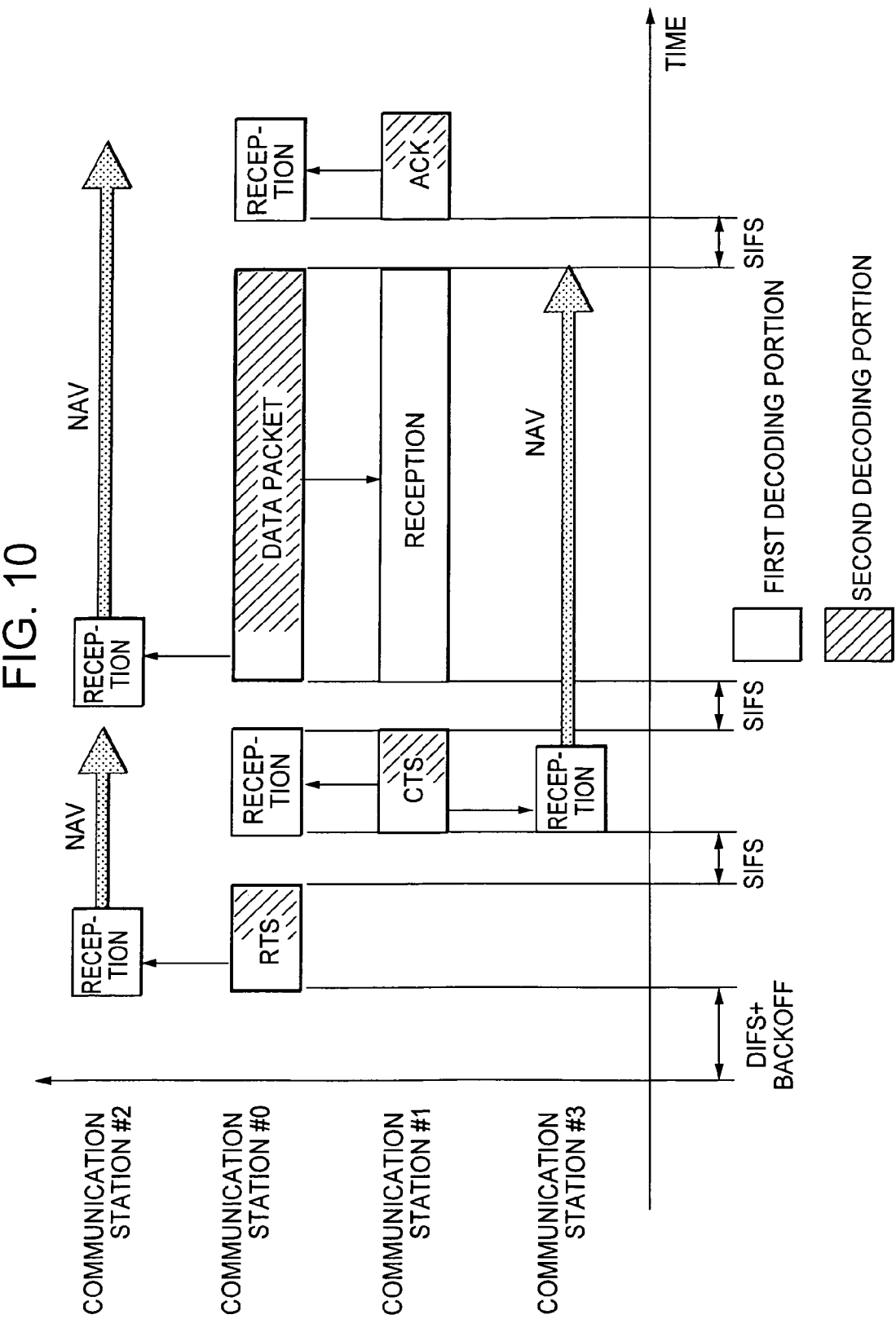
FIG. 10 is a view showing one of communication operation examples based on RTS/CTS using Shot NAV according to the present invention.
Figure 11:
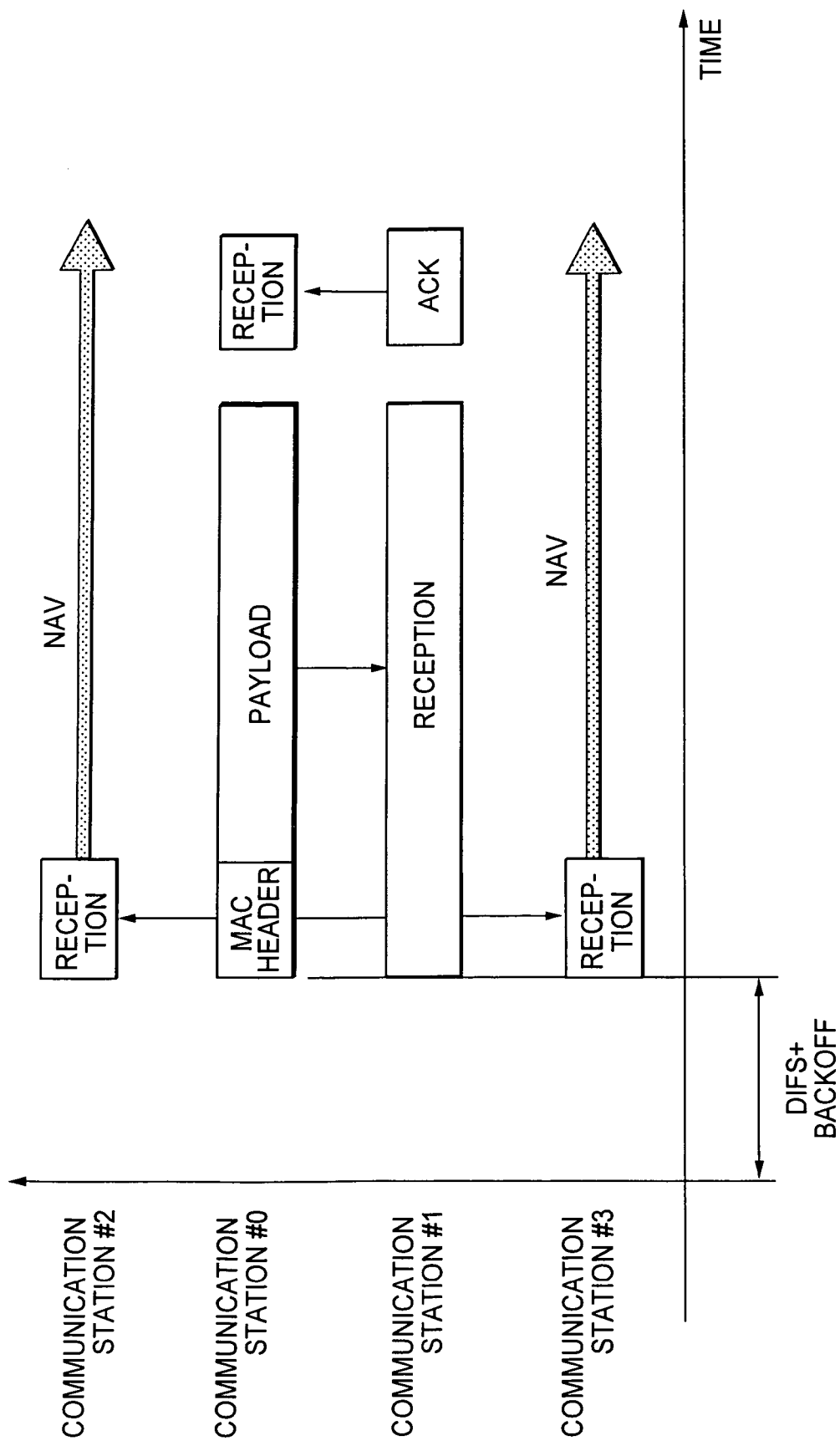
FIG. 11 is a view showing a communication operation example base on CSMA/CA according to a conventional technology.
Figure 12:
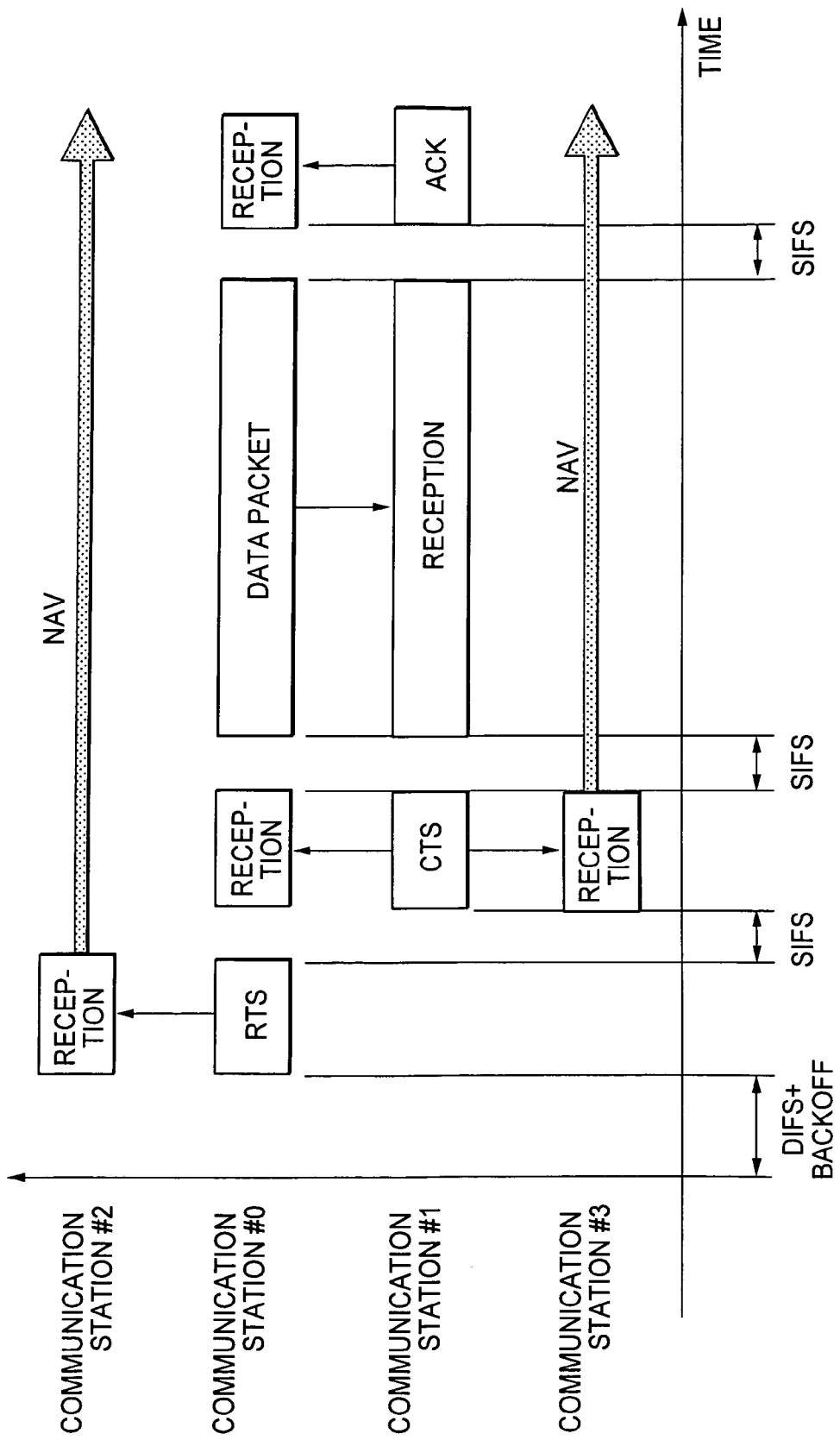
FIG. 12 is a view showing a communication operation example based on RTS/CTS according to a conventional technology.
Figure 13:
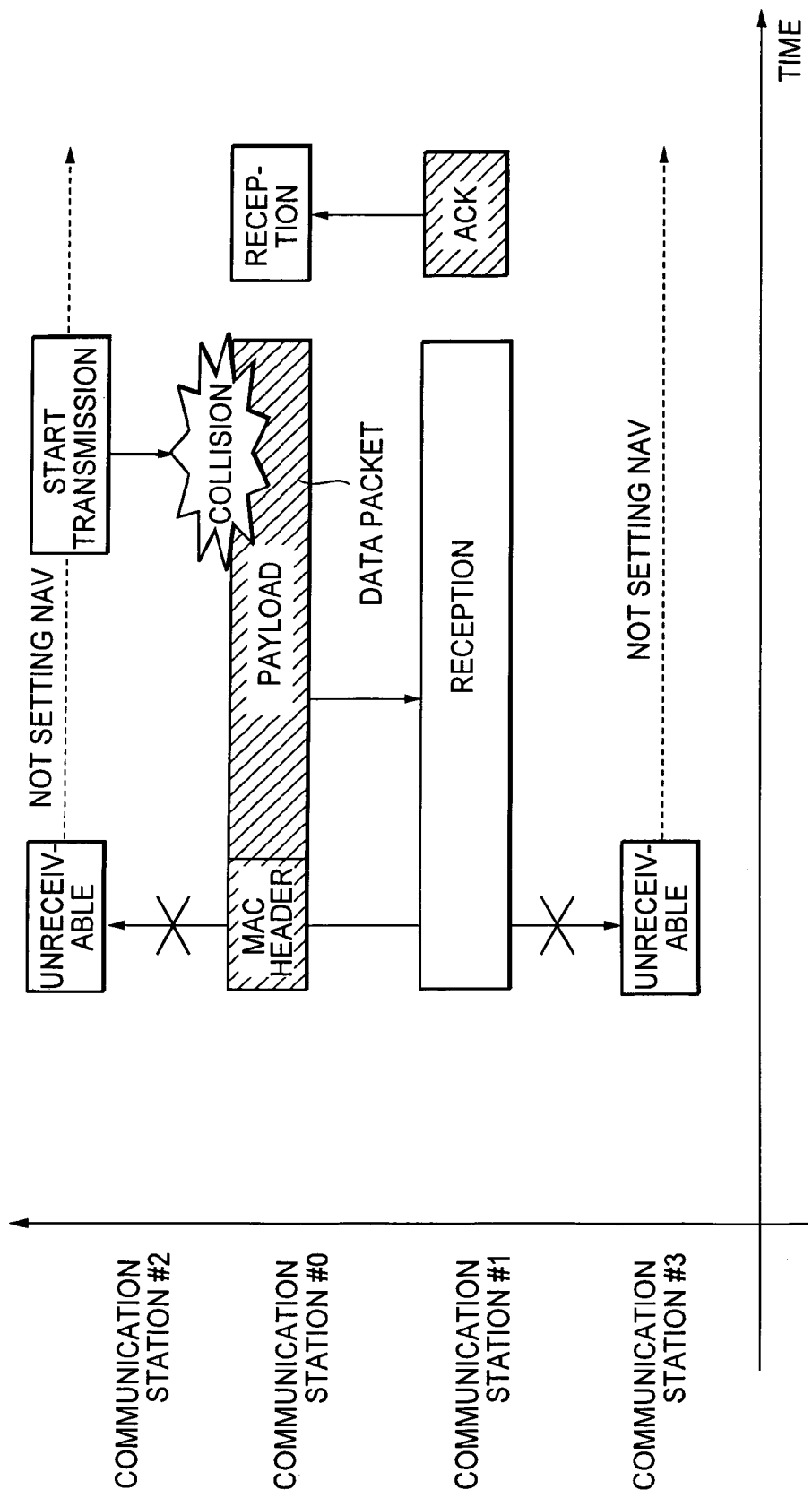
FIG. 13 is a view showing a communication operation example based on CSMA/CA under a communication environment in which conventional stations and high-grade communication stations intermix according to a conventional technology.
Figure 14:
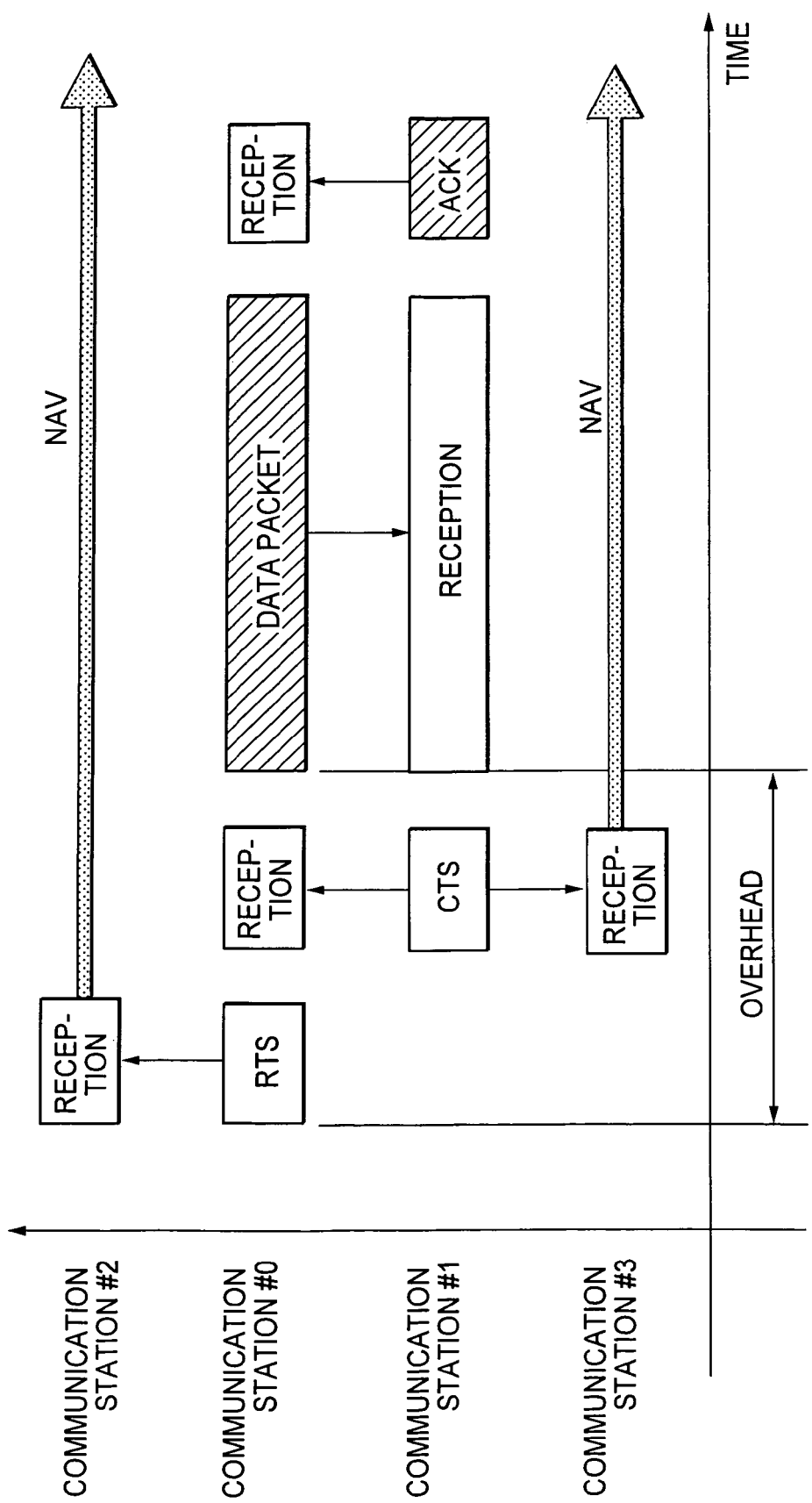
FIG. 14 is a view showing a communication operation example based on RTS/CTS in conformity with the IEEE 802.11g according to a conventional technology.

FIG. 10 shows a communication operation example based on the RTS/CTS using the Short NAV. Incidentally, in the shown example, a communication environment similar to one shown in FIG. 9 is supposed.

Each communication station having transmission data monitors a medium state for a predetermined inter frame space DIFS from the last detection of a packet. When any media are clear, namely when there are no transmission signals, the communication station performs random backoff. Furthermore, when there are no transmission signals also in this period, a transmission right is given to the communication station. In the shown example, after the inter frame space DIFS, the communication station #0, which has the random backoff set to be shorter than that of the other peripheral stations, acquires the transmission right to be able to start a data transmission to the communication station #1.

That is, the communication station #0, which transmits data, transmits a transmission request packet (RTS) to the communication station #1. On the other hand, the communication station #1 being the reception destination returns a confirmation note (CTS) to the communication station #0 after a shorter inter frame space Short IFS (SIFS).

Now, at the time of an RTS packet, the communication station #0 transmits a first portion corresponding to the PHY header according to a first communication method, which all communication stations can receive, and transmits a second portion corresponding to the MAC frame according to a second communication method, which only the high-grade communication stations can receive. Then, the transmission source communication station #0 performs the spoofing of the information of the transmission rate (Rate) and the packet length (Length) in the SIGNAL portion of the PHY header in order that the value of (packet length)/(rate) may be equal to the duration until an CTS packet.

Alternatively, the transmission source communication station #0 transmits the SIGNAL portion in the PHY header according to the first communication method, which all communication stations can receive, and successively transmits the SIGNAL-2 portion modulated according to a modulation system, which each high-grade communication station knows but the first communication stations do not know. After that, the communication station #0 transmits the second portion corresponding to the MAC frame according to the second communication method, which only the high-grade communication stations can receive. Then, the communication station #0 performs the spoofing of the information of the transmission rate (Rate) and the packet length (Length) in the SIGNAL portion of the PHY header in order that the value of (packet length)/(rate) may equal to the duration for which communications are desired to be stopped.

The communication station #2 as a conventional station can hear the SIGNAL portion of the RTS packet from the communication station #0, and set a packet length and a transmission rate different from the actual state to perform a reception operation for a period of time corresponding to (packet length)/(rate). The RTS packet from the communication station #0 is not transmitted for a period of (packet length)/(rate), but the communication station #2 tries to receive the data packet and do not start any transmissions. As a result, the communication station #2 restrains its transmission until the transmission of the CTS packet is completed. Moreover, because the rate and the packet length are different from the real transmission of the packet, the rate and the packet cannot be normally decoded, and the communication station #2 destroys the packet to transmitted according to the second communication method after that.

Further, when the communication station #2 is not a conventional station, but a high-grade communication station which does not support the transmission mode, the communication station #2 obtains a value corresponding to the duration by taking the difference (EIF−DIFS is added in the FIG. 16) between the (packet length)/(transmission rate) calculated based on the description in the SIGNAL portion of the RTS packet and the (true length)/(true rate) calculated based on the SIGNAL-2 portion, and refrains the transmission of the packet by setting NAV at the duration.

Moreover, the reception destination communication station #1 transmits the first portion corresponding to the PHY header according to the first communication method, which all communication station can receive, at the time of a transmission of a CTS packet, and transmits the second portion corresponding to the MAC frame according to the second communication method, which only the high-grade communication stations can receive. Then, the communication station #1 performs the spoofing of the information of the transmission rate (Rate) and the packet length (Length) in the SIGNAL portion of the PHY header in order that the value of (packet length)/(rate) may be equal to the duration until the data packet.

Alternatively, the reception destination communication station #1 transmits the SIGNAL portion in the PHY header according to the first communication method, which all communication stations can receive, and successively transmits the SIGNAL-2 portion modulated according to a modulation system which each high-grade communication station knows but the first communication stations do not know. After that, the reception destination communication station #1 transmits the second portion corresponding to the MAC frame according to the second communication method, which only the high-grade communication stations can receive. Then, the reception destination communication station #1 performs the spoofing of the information of the transmission rate (Rate) and the packet length (Length) in the SIGNAL portion of the PHY header in order that the value of (packet length)/(rate) may equal to the duration until the data packet for which communications are desired to be stopped.

The communication station #3 as the conventional station can hear the SIGNAL portion of the CTS packet from the communication station #1, and sets a packet length and a transmission rate different from the actual state to perform reception for a period of time corresponding to (packet length)/(rate). The CTS packet from the communication station #1 is not transmitted for a period of (packet length)/(rate), but the communication station #3 tries to receive the CTS packet and do not start any transmissions. As a result, the communication station #3 restrains its transmission until the completion of the transmission of the data packet. Moreover, because the rate and the packet length are different from the real transmission of the packet, the rate and the packet length cannot be normally decoded, and the communication station #3 destroy the packet to be transmitted after that according to the second communication method.

Further, when the communication station #3 is not a conventional station, but a high-grade communication station which does not support the transmission mode, the communication station #3 obtains a value corresponding to the duration by taking the difference (EIF−DIFS is added in the FIG. 16) between the (packet length)/(transmission rate) calculated based on the description in the SIGNAL portion of the CTS packet and the (true length)/(true rate) calculated based on the SIGNAL-2 portion, and refrains the transmission of the packet by setting NAV at the duration.

Then the communication station #0 starts the transmission of a data packet in response to the reception of the CTS packet after the inter frame space SIFS.

At the data transmission, the transmission source communication station #0 transmits the first portion corresponding to the PHY header according to the first communication method, which all communication stations can receive, and also transmits the second portion corresponding to the MAC frame according to the second communication method, which only the high-grade communication stations can receive. Then, the transmission source communication station #0 performs the spoofing of the information of the transmission rate (Rate) and the packet length (Length) in the SIGNAL portion of the PHY header in order that the value of (packet length)/(rate) may be equal to the duration of Duration until the ACK packet, and sets a spoofed flag indicating the spoofing.

Alternatively, the transmission source communication station #0 transmits the SIGNAL portion in the PHY header according to the first communication method, which all communication stations can receive, and successively transmits the SIGNAL-2 portion modulated according to a modulation system, which each high-grade communication station knows but the first communication stations do not know. After that, the transmission source communication station #0 transmits the second portion corresponding to the MAC frame according to the second communication method, which only the high-grade communication stations can receive. Then, the transmission source communication station #0 performs the spoofing of the information of the transmission rate (Rate) and the packet length (Length) in the SIGNAL portion of the PHY header in order that the value of (packet length)/(rate) may equal to the duration until the ACK packet for which communications are desired to be stopped.

The communication station #2 as a conventional station can hear the SIGNAL portion of the RTS packet from the communication station #0, and set a packet length and a transmission rate different from the actual state to perform a reception operation for a period of time corresponding to (packet length)/(rate). The data packet from the communication station #0 is not transmitted for a period of (packet length)/(rate), but the communication station #2 tries to receive the data packet and do not start any transmissions. As a result, the communication station #2 restrains its transmission until the transmission of the ACK packet is completed. Moreover, because the rate and the packet length are different from the real transmission of the packet, the rate and the packet cannot be normally decoded, and the communication station #2 destroys the packet to transmitted according to the second communication method after that.

Further, when the communication station #2 is not a conventional station, but a high-grade communication station which does not support the transmission mode, the communication station #2 obtains a value corresponding to the duration by taking the difference (EIF−DIFS is added in the FIG. 16) between the (packet length)/(transmission rate) calculated based on the description in the SIGNAL portion of the data packet and the (true length)/(true rate) calculated based on the SIGNAL-2 portion, and refrains the transmission of the packet by setting NAV at the duration.

When the communication station #1 detects the spoofing of the information of the packet length and the rate of a SIGNAL portion on the basis of the spoofed flag, the communication station #1 destroys the information. Furthermore, the communication station #1 receives the MAC frame as the successive second portion at the corresponding transmission rate, and performs the reception operation of the data addressed to the local station for the duration of Duration described in the MAC header. Then, when the reception of the data packet from the communication station #0 is completed, the communication station #1 returns an ACK packet to the data transmission source communication station #0 after the inter frame space SIFS.

As described above, when a peripheral conventional station (or a high-grade communication station which does not support the transmission mode) which becomes a concealed terminal receives at least one of the RTS and the CTS, the concealed terminal sets a transmission stop duration of the local station for the duration in which the transmission of the next packet is expected to be completed, and thereby collisions can be avoided.

As described above, in the present embodiment, the high-grade communication stations perform the spoofing of the description of the SIGNAL portion of the PHY header, and provide the transmission stop duration to the conventional stations until a transaction according to the high-grade communication method ends to obtain compatibility. That is, the conventional stations unable to deal with the high-grade communication method stop their transmissions for the duration in which the transmission of the next packet is expected to end, and thereby collisions can be avoided.

In the examples shown in FIGS. 8 and 9, in a communication procedure executed according to the second communication method, the spoofing of the description of the SIGNAL portion is performed in order that the conventional stations may stop their transmission operations for the duration until the ACK transmission ends. Moreover, when a packet transmission is performed according to a communication procedure to perform multiple connections with a plurality of communication stations in the MAC frame according to the second communication system, the ACK (response packet) transmission is performed in a time division multiplex from each remote station. Also in this case, the above-mentioned mechanism can be applied. Moreover, the transmission of the ACK packet hereupon is not limited to the case of single ACK packet, but includes, for example, the case where the ACK packet is multiplexed with other kinds of packets such as an RTS packet, a CTS packet and data packet to be transmitted.

Figure 17:
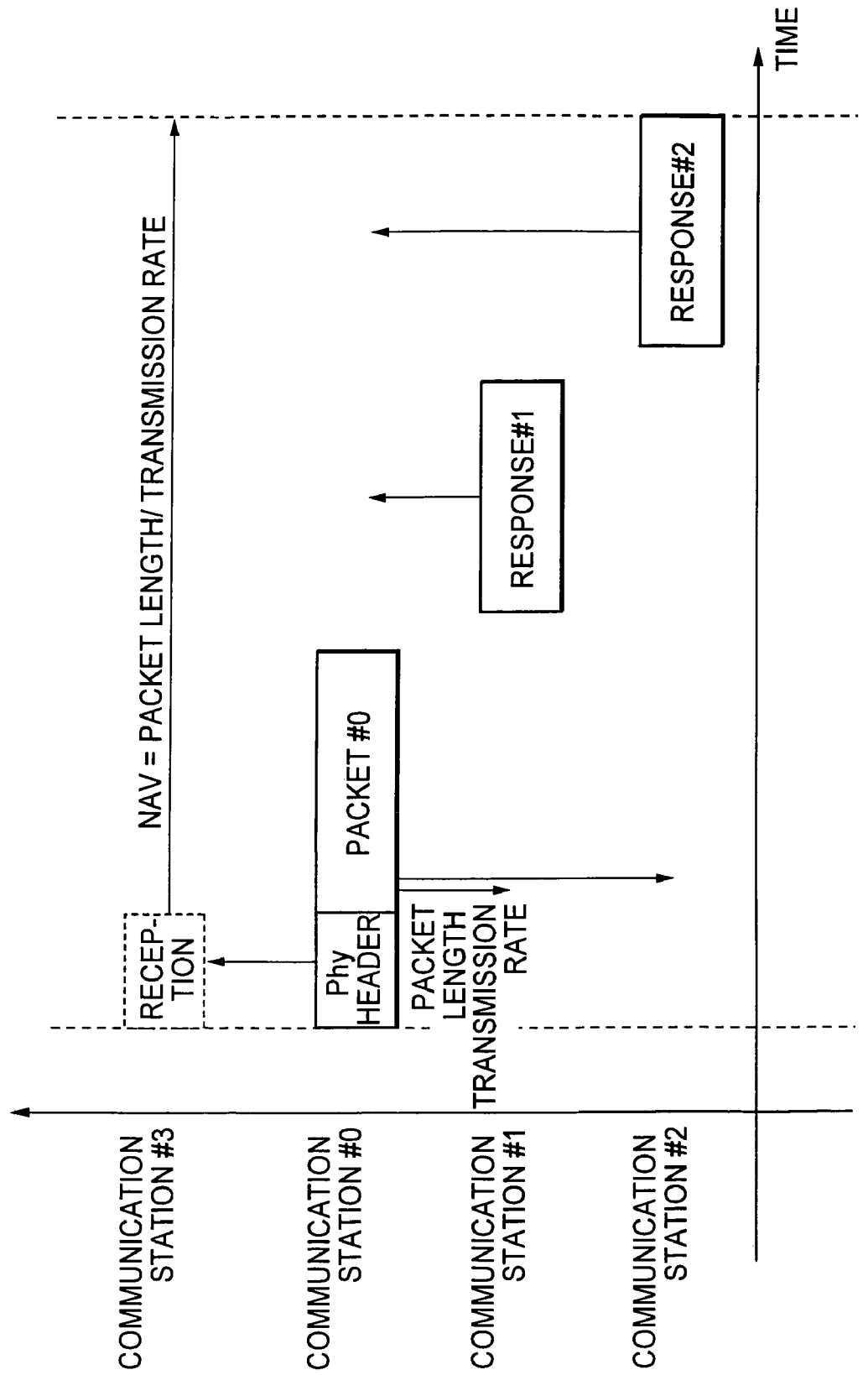
FIG. 17 is a view showing communication operation sequencing by which a plurality of reception stations replies by a time division response packet to a transmission packet from a transmission station.

FIG. 17 shows communication operation sequencing in which a plurality of reception stations replies by a response packet in time division to a transmission packet from a transmission station.

A packet #0 transmitted from the communication station #0 is supposed to request a reply from the communication station #1 and the communication station #2 severally. In the packet #0, the information for the timing of the transmissions of their response packets lest the response packets should collide to be notified to the communication station #1 and the communication station #2 is described.

At this time, the value of (packet length)/(rate) of the SIGNAL portion of the packet #0 is set to be the time when the receptions of all response packets have been completed. Thereby, it is prevented that the communication station #3 locating at a position distant from the communication station #1 and communication station #2 to the degree of unable to receiving the response packets from the communication stations #1 and #2 disturbs the responses. Because the SIGNAL portion is transmitted at the lowest rate, such setting is effective to eliminate such a concealed terminal.

Incidentally, Japanese Patent Application No. 2003-297919, which has been assigned to the present applicant already, discloses a communication system in which a transmission station transmits a data frame addressed to a plurality of reception stations in the space division multiple access (SDMA) and each reception station reply by ACK in the time division multiplex.

In the above, specific embodiments have been referred to while the present invention has been described in detail. However, it is clear that the person skilled in the art can modify and substitute the embodiments without departing from the scope and sprit of the present invention. That is, the present invention has bee disclosed in the form of exemplifying, and the contents of the description of the present specification should not be interpreted limitedly. For the judgment of the subject matter of the present invention, claims should be considered.

What is claimed is:

1. A wireless communication system, comprising:
   a first communication station configured to operate according to a first communication method; and
   a second communication station configured to operate according to both the first communication method and a second communication method and transmit a packet comprising a first portion including spoofed information of a packet length and transmission rate receivable according to said first communication method at a first transmission rate, a second portion including actual information of a packet rate and a transmission rate receivable according to said second communication method at a second transmission rate that is greater than said first transmission rate, and a third portion including transmission data receivable according to said second communication method at a third transmission rate that is greater than said second transmission rate.

2. The wireless communication system as cited in claim 1, wherein
   said first communication station receiving the packet calculates (packet length)/(transmission rate) on the basis of the packet length and the transmission rate of the spoofed information on the packet obtained by decoding said first portion in order to obtain a reception period of time for the packet.

3. The wireless communication system as cited in claim 2, wherein
   when said second communication station performs a communication procedure according to said second communication method, the second communication station describes the spoofed information of a packet length and a transmission rate in the first portion to designate a duration by (packet length)/(transmission rate) in order to stop the communication operation of the other stations for the communication procedure within the duration.

4. The wireless communication system as cited in claim 2, wherein
   said second communication station performing a packet transmission spoofs about the information of the packet length and the transmission rate to be described in the first portion in order that the first communication station receiving the packet stops its communication operation for the duration until a communication transaction to be performed according to the second communication method ends.

5. The wireless communication system as cited in claim 2, wherein
   said second communication station performing a packet transmission spoofs the information of the packet length and the transmission rate to be described in the first portion in order that the first communication station receiving the packet stops its communication operation for the duration until an ACK transmission ends in a communication procedure preformed according to the second communication method.

6. The wireless communication system as cited in claim 2, wherein
   when said second communication station carries out a packet transmission in accordance with a communication procedure to perform multiple connections with a plurality of communication stations in the second portion, said second communication station spoofs information of a packet length and a transmission rate so that the first communication station receiving the packet stops the communication operation in a duration until all of the ACK transmissions performed in a time division multiplex from each remote station end.

7. The wireless communication system as cited in claim 2, wherein
   said second communication method includes a plurality of communication modes; and
   said second communication station represents the communication mode with a combination of a packet length and a transmission rate designating the same communication stop period.

8. The wireless communication system as cited in claim 3, wherein
   said second communication station performing the packet transmission describes whether the spoofed information of a packet length and a transmission rate is described in the first portion or not in the packet in a format which the second communication station operating according to the second communication method can decode but the first communication station operating according to the first communication method cannot decode.

9. The wireless communication system as cited in claim 8, wherein
   said second communication station performing the packet transmission indicates in the first portion whether the spoofed information of a packet length and a transmission rate is described or not.

10. The wireless communication system as cited in claim 3, wherein
    when said second communication station detects that the information of a packet length and a transmission rate in the first portion of the packet received from another station is spoofed, said second communication station switches its reception method to the second communication method to perform the reception operation of the residual portion of the packet.

11. A wireless communication apparatus operating under a communication environment in which a first communication method and a second communication method coexist, comprising:
- communication unit configured to perform transmission and reception of a wireless data by said first communication method and said second communication method on a communication channel;
- a packet generation unit configured to generate a transmission packet of local station;
- a packet decoding unit configured to decode a received packet from another station; and
- a control unit configured to control communication operation, wherein
- said control unit transmits a first portion of the transmission packet including spoofed information of a packet length and transmission rate with the first communication method at a first transmission rate, transmits a second portion of the transmission packet including actual information of a packet rate and a transmission rate with the second communication method at a second transmission rate that is greater than the first transmission rate, and transmits a third portion of the transmission packet including transmission data with the second communication method at a third transmission rate that is greater than the second transmission rate.

12. The wireless communication apparatus as cited in claim 11, wherein
- the first portion of the received packet is decoded and analyzed with the first communication method; and
- the second portion of the received packet is decoded and analyzed with the second communication method.

13. The wireless communication apparatus as cited in claim 11, wherein
- when transmitting said third portion according to said second communication method, said packet generation unit describes the spoofed information of the packet length and the transmission rate in the first portion in order that the first communication station receiving the packet stops its communication operation for the duration until a communication transaction to be performed according to the second communication method ends.

14. The wireless communication apparatus as cited in claim 11, wherein
- when transmitting said third portion according to said second communication method, said packet generation unit describes the spoofed information of a packet length and a transmission rate in the first portion in order that the first communication station receiving the packet stops its communication operation for the duration until an ACK transmission in a communication procedure performed according to the second communication method ends.

15. The wireless communication apparatus as cited in claim 11, wherein
- when a packet transmission is performed in accordance with a communication procedure to perform multiple connections with a plurality of communication stations in the third portion, said packet generation unit describes the spoofed information of a packet length and a transmission rate in the first portion in order that the first communication station receiving the packet stops its communication operation for the duration until an ACK transmission in a communication procedure performed according to the second communication method ends.

16. The wireless communication apparatus as cited in claim 11, wherein
- when transmitting said third portion according to said second communication method, said packet generation unit describes the spoofed information of a packet length and a transmission rate in the first portion to designate a duration by (packet length)/(transmission rate) in order to stop the communication operation of the other stations for the communication procedure within the duration.

17. The wireless communication apparatus as cited in claim 16, wherein
- said packet generation unit describes whether the spoofed information of a packet length and a transmission rate is described in the first portion or not in the packet in a format which the second communication station operating according to the second communication method can decode but the first communication station operating according to the first communication method cannot decode.

18. The wireless communication apparatus as cited in claim 17, wherein
- said packet generation unit indicates whether the spoofed information of the packet length and the transmission rate is described or not in the first portion.

19. The wireless communication apparatus as cited in claim 16, wherein
- when said packet generation unit detects that the information of the packet length and the transmission rate in the first portion of the packet received from another station is spoofed, said control unit switches its reception method to the second communication method to perform the reception operation of the residual portion of the packet.

20. The wireless communication apparatus as cited in claim 19, wherein
- said control unit tries to decode the second communication method portion with both the first communication method and the second communication method that the first communication station cannot decode, and performs the reception operation with the obtained second communication mode when said control unit can decode with the communication method.

21. The wireless communication apparatus as cited in claim 16, wherein
- said second communication method includes a plurality of communication modes; and
- said packet generation unit represents the communication mode with a combination of a packet length and a transmission rate designating the same communication stop period.

22. A wireless communication method for carrying out wireless communication operation under a communication environment in which a first communication method and a second communication method coexist, comprising:
- a communication step for performing transmission and reception of a wireless data by said first communication method and said second communication method on a channel;
- a packet generation step for generating a transmission packet including a first portion, a second portion, and a third portion; and
- a packet transmission step for transmitting said first portion of the transmission packet including spoofed information of a packet length and transmission rate with the first communication method at a first transmission rate, transmitting said second portion of the transmission packet including actual information of a packet length and a transmission rate with the second communication method at a second transmission rate that is greater than the first transmission rate, and transmitting a third portion of the transmission packet including transmission data with the second communication method at a third transmission rate that is greater than the second transmission rate.

23. The wireless communication method as cited in claim 22, further comprising:
a packet receiving step for receiving and analyzing the first portion of the received packet from another station with the first communication method; and
a second receiving step for receiving and analyzing the second portion of the received packet with the second communication method.

24. The wireless communication apparatus as cited in claim 23, wherein
said packet generation step describes the spoofed information of a packet length and a transmission rate in the first portion to designate a duration by (packet length)/(transmission rate) in order to stop the communication operation of the other stations for the communication procedure within the duration.

25. The wireless communication method as cited in claim 22, wherein
said packet generation step describes the spoofed information of the packet length and the transmission rate in the first portion in order that the first communication station receiving the packet stops its communication operation for the duration until a communication transaction to be performed according to the second communication method ends.

26. The wireless communication method as cited in claim 22, wherein
said packet generation step describes the spoofed information of the packet length and the transmission rate in the first portion in order that the first communication station receiving the packet stops its communication operation for the duration until an ACK transmission in a communication procedure performed according to the second communication method ends.

27. The wireless communication method as cited in claim 22, wherein
when a packet transmission is performed in accordance with a communication procedure to perform multiple connections with a plurality of communication stations said packet generation step describes the spoofed information of the packet length and the transmission rate in the first portion in order that the first communication station receiving the packet stops its communication operation for the duration until an ACK transmission in a communication procedure performed according to the second communication method ends.

28. The wireless communication method as cited in claim 24, wherein
said packet generation step describes whether the spoofed information of a packet length and a transmission rate is described in the first portion or not in the packet in a format which the second communication station operating according to the second communication method can decode but the first communication station operating according to the first communication method cannot decode.

29. The wireless communication method as cited in claim 28, wherein
said packet generation step describes whether the spoofed information of the packet length and the transmission rate is described or not in the first portion.

30. The wireless communication method as cited in claim 24, wherein
when detected that the information of the packet length and the transmission rate in the first portion of the packet received from another station is spoofed, said second packet receiving step carries out its reception to perform the reception operation of the residual portion of the packet.

31. The wireless communication method as cited in claim 24, wherein
said second communication method includes a plurality of communication modes; and
said packet generation step represents the communication mode with a combination of a packet length and a transmission rate designating the same communication stop period.

32. A computer-readable medium including a computer program, which when executed by a computer, causes the computer to perform a method of wireless communication under a wireless communication environment in which a first communication method and a second communication method coexist, said method comprising:
generating a transmission packet composed of a first portion, a second portion, and a third portion; and
transmitting the first portion of the transmission packet including spoofed information of a packet length and transmission rate according to the first communication method at a first transmission rate, transmitting the second portion of the transmission packet including actual information of a packet length and transmission rate according to the second communication method at a second transmission rate that is greater than the first transmission rate, and transmitting the third portion of the transmission packet including transmission data according to the second communication method at a third transmission rate that is greater than the second transmission rate.

33. A wireless communication system where a plurality of communication methods is able to operate, comprising:
a plurality of communication stations, at least one of the plurality of communication stations configured to transmit a packet including a first portion including spoofed information of a packet length and transmission rate decodable by the plurality of communication stations at a first transmission rate, a second portion including actual information of a packet length and transmission rate decodable by not all of the plurality of communication stations at a second transmission rate that is greater than the first transmission rate, and a third portion including transmission date decodable by not all of the plurality of communication stations at a third transmission rate that is greater than the second transmission rate.

34. The wireless communication system as cited in claim 33, further comprising:
a communication station receiving the packet configured to calculate the reception period of time for receiving said packet on the basis of the spoofed information related to the packet length and the transmission rate in the first portion of the received packet; and the communication station transmitting the packet having the second portion spoofs so that the information related to the packet length and the transmission rate in the first portion designates a duration where the communication operation by the other communication stations are stopped for ensuring the communication sequence of said packet.

35. The wireless communication system as cited in claim 34, wherein
the communication station transmitting the packet having the third portion spoofs the information of the packet length and the transmission rate described in the first portion in order to stop the communication operations of the other communication stations after decoding the first portion for the duration until an ACK transmission ends in a communication sequence of said packet.

36. The wireless communication system as cited in claim 34, wherein
the communication station transmitting the packet in accordance with a communication procedure for performing multiple connections with a plurality of communication stations in the third portion spoofs the information of the packet length and the transmission rate described in the first portion in order to stop the communication operations of the other communication stations after decoding the first portion in the duration until all of the ACK transmissions performed in a time division multiplex from each remote station end in a communication procedure of said packet.

37. The wireless communication system as cited in claim 34, wherein
the communication station which can decode the second portion decodes the second portion when detected that the first portion of the received packet is spoofed.

38. The wireless communication system as cited in claim 33, wherein
the communication station transmitting the packet having the second portion describes, within the packet, whether or not the spoofed information of a packet length and a transmission rate is described in the first portion in a format which is decodable by the communication stations which can decode the second portion but in not decodable by the communication station which can not decode the second portion.

39. The wireless communication system as cited in claim 38, wherein
the communication station transmitting the packet having the second portion indicates in the first portion whether or not the spoofed information of a packet length and a transmission rate is described in the first portion.

40. The wireless communication system as cited in claim 33, further including a plurality of communication modes for transmitting the second portion, wherein
the communication station transmitting the packet having the second portion is provided with a second communication method portion which can be decoded by all the communication stations that can decode the second portion, and
the second communication method portion designates the communication mode.

41. The wireless communication system as cited in claim 40, wherein
the communication station transmitting the packet having the second portion transmits the second communication method portion in a format that is not decoded by the communication which can not decode the second portion.

42. The wireless communication system as cited in claim 40, further comprising:
a plurality of communication channels; and
the communication mode for bundling more than two communication channels; wherein
the communication station transmitting the packet in which the second portion is bundled by more than two communication channels transmit the first portion and the second communication method portion of said packet on each communication channel being used separately; and
the communication station unable to receive the packet transmitted by bundling more than two communication channels calculates the period for stopping the communication operation to ensure the communication sequence of the received packet, and refrains the transmission of the packet within said period, on the basis of the spoofed information of a packet length and a transmission rate described in the first portion of received packet on at least one communication channel, or on the basis of the spoofed information of a packet length and a transmission rate described in the first portion received on at least one communication channel and the information related to an actual packet length and a transmission rate described in the second communication method portion.

43. A wireless communication apparatus configured to operate according to a plurality of communication methods under the wireless communication environment, comprising:
a packet generation unit configured to generate a transmission packet of local station;
a packet decoding unit configured to decode a received packet from another station; and
a control unit configured to control communication operation, wherein
said control unit transmits a package having a first portion including spoofed information of a packet length and transmission rate decodable by all communication stations at a first transmission rate, a second portion including information of an actual packet length and transmission rate decodable by not all of communication stations at a second transmission rate greater than the first transmission rate, and a third portion including transmission data decodable by not all of communication stations at a third transmission rate that is greater than the second transmission rate.

44. The wireless communication apparatus as cited in claim 43, wherein
said packet generation unit spoofs so that a duration within which the communication operation of the other communication stations are wanted to be stopped to ensure the communication sequence of said packet is notified, and describe the information related to the packet length and a transmission rate of said packet.

45. The wireless communication apparatus as cited in claim 44, wherein
said packet generation unit spoofs the information of the packet length and the transmission rate to be described in the first portion in order to stop the communication operations of the other communication stations after decoding the first portion in the duration until an ACK transmission ends in a communication sequence of said packet.

46. The wireless communication apparatus as cited in claim 44, wherein
in case of transmitting a packet in accordance with a communication procedure to perform multiple connections with a plurality of communication stations in the third portion, said packet generation unit spoofs the information of the packet length and the transmission rate to be described in the first portion in order to stop the communication operations of the other communication stations after decoding the first portion in the duration until all of the ACK transmissions performed in a time division multiplex from each remote station end in a communication procedure of said packet.

47. The wireless communication apparatus as cited in claim 44, wherein
said control unit decodes the second portion when detected that the first portion of the received packet is spoofed.

48. The wireless communication apparatus as cited in claim 43, wherein
said packet generation unit describes in the packet whether or not the spoofed information of a packet length and a transmission rate is described in the first portion in a format decodable by the communication stations which can decode the second portion but not decodable by the communication station which can not decode the second portion.

49. The wireless communication apparatus as cited in claim 48, wherein
said packet generation unit indicates in the first portion whether or not the spoofed information of a packet length and a transmission rate is described in the first portion.

50. The wireless communication apparatus as cited in claim 43, wherein
a plurality of communication modes for transmitting the second portion are provided under said wireless communication environment, and
said packet generation unit is provided with a second communication method portion decodable by all the communication stations that can decode the second portion, and
the communication mode is indicated in the second communication method portion.

51. The wireless communication apparatus as cited in claim 50, wherein
said control unit transmits the second communication method portion in a format that is not decodable by the communication station which can not decode the second portion.

52. The wireless communication apparatus as cited in claim 50, wherein
under the said wireless communication environment, a plurality of communication channels are provided, and the communication mode of more than two communication channels bundled is also permitted; and the first portion and the second communication method portion of said packet are transmitted separately on each communication channel being used, by the communication station performing transmission of packet in which the second portion is bundled by more than two communication channels; and
when the packet transmitted by more than two communication channels bundled can not be received, said control unit calculates the period for stopping the communication operation to ensure the communication sequence of the received packet and restrains the transmission of the packet within said period, on the basis of the spoofed information of a packet length and a transmission rate described in the first portion of received packet on at least one communication channel, or on the basis of the spoofed information of a packet length and a transmission rate described in the first portion received on at least one communication channel and the information related to an actual packet length and a transmission rate described in the second communication method portion.

53. A wireless communication method for operating according to a plurality of communication methods under the wireless communication environment, comprising:
a packet generation step for generating a transmission packet including a first portion, a second portion, and a third portion; and
a packet transmission step for transmitting said first portion including spoofed information of a packet length and transmission rate in the format decodable by all the communication stations at a first transmission rate, transmitting said second decoding portion including actual information of a packet length and a transmission rate in the format decodable by not all of the communication stations at a second transmission rate that is greater than the first transmission rate, and transmitting the third portion including transmission data in the formation decodable by not all of the communication stations at a third transmission rate that is greater than the second transmission rate.

54. The wireless communication method as cited in claim 53, further comprising:
a packet receiving step for receiving and analyzing the first portion of the received packet from another station; and
a second receiving step for receiving and analyzing the second portion of the received packet.

55. The wireless communication method as cited in claim 54, wherein
said packet generation step spoofs so that a duration within which the communication operation of the other communication stations are wanted to be stopped to ensure the communication sequence of said packet is notified, and describe the information related to the packet length and a transmission rate of said packet.

56. The wireless communication method as cited in claim 55, wherein
said packet generation step spoofs the information of the packet length and the transmission rate to be described in the first portion in order to stop the communication operations of the other communication stations after decoding the first portion in the duration until an ACK transmission ends in a communication sequence of said packet.

57. The wireless communication method as cited in claim 55, wherein
when carrying out a packet transmission in accordance with a communication procedure to perform multiple connections with a plurality of communication stations in the second portion, said packet generation step spoofs the information of the packet length and the transmission rate to be described in the first portion in order to stop the communication operations of the other communication stations after decoding the first portion in the duration until all of the ACK transmissions performed in a time division multiplex from each remote station end in a communication procedure of said packet.

58. The wireless communication method as cited in claim 55, wherein
said packet transmission step transmits the signal in a packet which shows whether or not the spoofed information of a packet length and a transmission rate is described in the first portion in a format that the communication stations which can decode the second portion can decode but the communication station which can not decode the second portion can not decode.

59. The wireless communication method as cited in claim 58, wherein
said packet transmission step transmits the first portion which shows whether or not the spoofed information of a packet length and a transmission rate is described in the first portion.

60. The wireless communication method as cited in claim 55, wherein
the second portion of the received packet is received and analyzed by said second packet receiving step when detected that the first portion of the received packet is spoofed by said packet receiving step.

61. The wireless communication method as cited in claim 55, wherein
a plurality of communication modes for transmitting the second portion are provided under said wireless communication environment, and
said packet generation step is provided with a second communication method portion decodable by all the communication stations that can decode the second portion, and
the communication mode is indicated in the second communication method portion.

62. The wireless communication method as cited in claim 61, wherein
under the said wireless communication environment, a plurality of communication channels are provided, and the communication mode of more than two communication channels bundled is also permitted; and the first portion and the second communication method portion of said packet are transmitted separately on each communication channel being used, by the communication station performing transmission of packet in which the second portion is bundled by more than two communication channels; and
when the packet transmitted by more than two communication channels bundled can not be received, said second packet receiving step calculates the period for stopping the communication operation to ensure the communication sequence of the received packet and restrains the transmission of the packet within said period, on the basis of the spoofed information of a packet length and a transmission rate described in the first portion of received packet on at least one communication channel, or on the basis of the spoofed information of a packet length and a transmission rate described in the first portion received on at least one communication channel and the information related to an actual packet length and a transmission rate described in the second communication method portion.

63. The wireless communication method as cited in claim 54, wherein
said second packet receiving step performs a reception operation of the third portion on the basis of the information related to the actual packet length and the transmission rate described in the second portion of the received packet.

64. The wireless communication method as cited in claim 54, wherein
said second packet receiving step, when the second portion can not be decoded on the basis of the information related to the actual packet length and the transmission rate described in the second communication method portion of the received packet, or when the location station does not support the communication mode described in the second communication method portion of the received package, calculates the period for stopping the communication operation to ensure the communication sequence of the received packet, and restrains the transmission of the packet within said period.

65. A computer-readable medium including computer program instructions, which when executed by a computer, cause the computer to perform a method of wireless communication in a wireless communication environment which is able to operate wireless communication according to a plurality of communication methods, comprising:
generating a transmission packet including a first portion, a second portion, and a third portion; and
transmitting said first portion including spoofed information of a packet length and transmission rate in the format decodable by all the communication stations at a first transmission rate, transmitting said second decoding portion including actual information of a packet length and a transmission rate in the format decodable by not all of the communication stations at a second transmission rate that is greater than the first transmission rate, and transmitting the third portion including transmission data in the formation decodable by not all of the communication stations at a third transmission rate that is greater than the second transmission rate.

66. A wireless communication method for carrying out wireless communication operation under a communication environment in which a first communication method and a second communication method coexist, comprising:
performing transmission and reception of a wireless data by said first communication method and said second communication method on a channel;
generating a transmission packet including a first portion, a second portion, and a third portion; and
transmitting said first portion of the transmission packet including spoofed information of a packet length and transmission rate with the first communication method at a first transmission rate, transmitting said second portion of the transmission packet including actual information of a packet length and a transmission rate with the second communication method at a second transmission rate that is greater than the first transmission rate, and transmitting a third portion of the transmission packet including transmission data with the second communication method at a third transmission rate that is greater than the second transmission rate.

67. A wireless communication method for operating according to a plurality of communication methods under the wireless communication environment, comprising:
generating a transmission packet including a first portion, a second portion, and a third portion; and
transmitting said first portion including spoofed information of a packet length and transmission rate in the format decodable by all the communication stations at a first transmission rate, transmitting said second decoding portion including actual information of a packet length and a transmission rate in the format decodable by not all of the communication stations at a second transmission rate that is greater than the first transmission rate, and transmitting said third portion including transmission data in the formation decodable by not all of the communication stations at a third transmission rate that is greater than the second transmission rate.

68. A wireless communication system, comprising:
a first communication station configured to operate according to a first communication method; and a second communication station configured to operate according to both the first communication method and a second communication method including a plurality of communication modes and transmit a packet composed of a first portion including spoofed information of a packet length and transmission rate receivable according to said first communication method, and a second portion receivable according to said second communication method, wherein said first communication station receiving the packet calculates (packet length)/(transmission rate) on the basis of the packet length and the transmission rate of the spoofed information on the packet obtained by decoding said first portion in order to obtain a reception period of time for the packet, said second communication station is provided with a known second communication method portion which the second communication station can decode, in the packet, and a communication mode is represented by the second communication method portion, the second communication station performing the packet transmission locates the second communication method portion before the second portion in the packet, and describes the information related to an actual packet length and a transmission rate in the second portion within the second communication method portion, when the spoofed information of a packet length and a transmission rate for the first communication station is described in the first portion, and said second communication station receiving the packet tries to perform the reception operation of the second portion on the basis of the information related to a packet length and a transmission rate described in the second communication method portion of the received packet, and when the second communication station cannot decode the second portion, the second communication station restrains the transmission of the packet for a predetermined period of time by taking a difference between a period of time obtained from the spoofed packet length and the transmission rate described in the first portion and a period of time obtained from the packet and the transmission rate described in the second communication method portion.

69. A wireless communication apparatus operating under a communication environment in which a first communication method and a second communication method coexist, comprising:

communication unit configured to perform transmission and reception of a wireless data by said first communication method and said second communication method including a plurality of communication modes on a communication channel;

a packet generation unit configured to generate a transmission packet of local station;

a packet decoding unit configured to decode a received packet from another station; and a control unit configured to control communication operation, wherein said control unit transmits a first portion of the transmission packet including spoofed information of a packet length and transmission rate with the first communication method, and transmits a second portion of the transmission packet with the second communication method, when transmitting said second portion according to said second communication method, said packet generation unit describes the spoofed information of a packet length and a transmission rate in the first portion to designate a duration by (packet length)/(transmission rate) in order to stop the communication operation of the other stations for the communication procedure within the duration, said packet generation unit is provided with a known second communication method portion which the second communication station can decode, in the packet; and a communication mode is represented by the second communication method portion, said packet generation unit locates the second communication method portion before the second portion in the packet, and describes the information related to an actual packet length and a transmission rate in the second portion within the second communication method portion, when the spoofed information of a packet length and a transmission rate for the first communication station is described in the first portion, and said control unit tries to perform the reception operation of the second portion on the basis of the information related to a packet length and a transmission rate described in the second communication method portion of the received packet, and when said control unit cannot decode the second portion, said control unit restrains the transmission of the packet for a predetermined period of time by taking a difference between a period of time obtained from the spoofed packet length and the transmission rate described in the first portion and a period of time obtained from the packet and the transmission rate described in the second communication method portion.

70. A wireless communication method for carrying out wireless communication operation under a communication environment in which a first communication method and a second communication method that includes a plurality of communication modes coexist, comprising:

a communication step for performing transmission and reception of a wireless data by said first communication method and said second communication method on a channel;

a packet generation step for generating a transmission packet including a first portion and a second portion; and a packet transmission step for transmitting said first portion of the transmission packet including spoofed information of a packet length and transmission rate with the first communication method, and transmitting said second portion of the transmission packet with the second communication method, further comprising:

a packet receiving step for receiving and analyzing the first portion of the received packet from another station with the first communication method; and a second receiving step for receiving and analyzing the second portion of the received packet with the second communication method, wherein when transmitting said second portion according to said second communication method at said packet transmission step, said packet generation step describes the spoofed information of a packet length and a transmission rate in the first portion to designate a duration by (packet length)/(transmission rate) in order to stop the communication operation of the other stations for the communication procedure within the duration, said packet generation step is provided with a known second communication method portion which the second communication station can decode, in the packet, and a communication mode is represented by the second communication method portion, said packet generation step locates the second communication method portion before the second portion in the packet, and describes the information related to an actual packet length and a transmission rate in the second portion within the second communication method portion, when the spoofed information of a packet length and a transmission rate for the first communication station is described in the first portion, and wherein said second packet receiving step tries to perform the reception operation of a second portion on the basis of the information related to a packet length and a transmission rate described in the second communication method portion of the received packet, and when said control unit cannot decode the second portion, said control unit restrain the transmission of a packet for a predetermined period of time by taking a difference between a period of time obtained from the spoofed packet length and the transmission rate described in the first portion and a period of time obtained from the packet and the transmission rate described in the second communication method portion.

* * * * *